(12) United States Patent
Bloechl et al.

(10) Patent No.: US 10,708,970 B2
(45) Date of Patent: Jul. 7, 2020

(54) BLE NETWORKING SYSTEMS AND METHODS PROVIDING CENTRAL AND PERIPHERAL ROLE REVERSAL WITH ENHANCED PERIPHERAL LOCATION DETERMINATION USING CONSTANT TONE EXTENSION ANALYSIS FOR A SAME CHANNEL

(71) Applicant: Link Labs, Inc., Annapolis, MD (US)

(72) Inventors: Mark Bloechl, Elkridge, MD (US); Ricardo Luna, Jr., Las Cruces, NM (US); Patrick Li, Potomac, MD (US); Brian Emery Ray, Annapolis, MD (US)

(73) Assignee: Link Labs, Inc., Annapolis, MD (US)

( * ) Notice: Subject to any disclaimer, the term of this patent is extended or adjusted under 35 U.S.C. 154(b) by 0 days.

(21) Appl. No.: 16/683,632

(22) Filed: Nov. 14, 2019

(65) Prior Publication Data

US 2020/0113006 A1 Apr. 9, 2020

Related U.S. Application Data

(63) Continuation-in-part of application No. 16/450,043, filed on Jun. 24, 2019, now Pat. No. 10,506,498, (Continued)

(51) Int. Cl.
*H04W 76/15* (2018.01)
*H04W 74/00* (2009.01)
(Continued)

(52) U.S. Cl.
CPC ............ *H04W 76/15* (2018.02); *H04W 4/80* (2018.02); *H04W 74/002* (2013.01); *H04W 76/11* (2018.02)

(58) Field of Classification Search
CPC ................................ H04W 76/15; H04W 4/80
See application file for complete search history.

(56) References Cited

U.S. PATENT DOCUMENTS

| 5,220,332 A | 6/1993 | Beckner et al. |
| 5,920,287 A | 7/1999 | Belcher et al. |

(Continued)

FOREIGN PATENT DOCUMENTS

| EP | 1420550 A2 | 5/2004 |
| EP | 3343245 A1 | 7/2018 |
| WO | 2016053909 A1 | 4/2016 |

OTHER PUBLICATIONS

Bluetooth Core Specification v 5.0, Dec. 2016. p. 252-256.
(Continued)

*Primary Examiner* — Hsinchun Liao
(74) *Attorney, Agent, or Firm* — Charles B. Lobsenz; Brian H. Buck; Potomac Law Group, PLLC

(57) ABSTRACT

Provided are systems and methods for reversing the conventional roles of central and peripheral devices in a BLE network. Doing so includes implementing an end node (EN) as the sole initiator of a connection between a particular EN and a particular access point (AP). Such implementation includes determining a location of the EN, in which that location is resolved by the EN and defined with respect to exchanges of Constant Tone Extensions (CTEs) between the EN and reference points (RPs).

12 Claims, 20 Drawing Sheets

Related U.S. Application Data which is a continuation-in-part of application No. 16/255,246, filed on Jan. 23, 2019, now Pat. No. 10,484,932, which is a continuation-in-part of application No. 16/177,915, filed on Nov. 1, 2018, now Pat. No. 10,499,196, which is a continuation-in-part of application No. 15/626,083, filed on Jun. 17, 2017, now Pat. No. 10,244,373.

(51) Int. Cl.
*H04W 76/11* (2018.01)
*H04W 4/80* (2018.01)

(56) References Cited

U.S. PATENT DOCUMENTS

| | | |
|---|---|---|
| 6,469,628 B1 | 10/2002 | Richards et al. |
| 7,141,715 B2 | 11/2006 | Shapira |
| 7,242,294 B2 | 7/2007 | Warrior et al. |
| 7,411,921 B2 | 8/2008 | Strong et al. |
| 7,518,500 B2 | 4/2009 | Aninye et al. |
| 7,973,655 B2 | 7/2011 | Blinnikka et al. |
| 8,026,814 B1 | 9/2011 | Heinze et al. |
| 8,368,555 B2 | 2/2013 | Gilbert et al. |
| 8,405,543 B2 | 3/2013 | Kluge et al. |
| 8,712,330 B2 | 4/2014 | Desai et al. |
| 8,831,627 B2 | 9/2014 | Aninye et al. |
| 8,849,926 B2 | 9/2014 | Marzeneki et al. |
| 9,274,218 B2 | 3/2016 | Kluge et al. |
| 9,282,582 B1 | 3/2016 | Dunsbergen et al. |
| 9,328,857 B2 | 5/2016 | Conte et al. |
| 9,374,667 B1 | 6/2016 | Jorgensen et al. |
| 9,426,616 B1 | 8/2016 | Rasband et al. |
| 9,439,041 B2 | 9/2016 | Parvizi et al. |
| 9,788,167 B2 | 10/2017 | Geng et al. |
| 9,992,633 B2 | 6/2018 | Deng et al. |
| 10,028,105 B1 | 7/2018 | Swart |
| 10,264,436 B1 | 4/2019 | Wohler et al. |
| 10,416,301 B2 | 9/2019 | Kluge et al. |
| 10,466,350 B2 | 11/2019 | Kluge et al. |
| 2002/0045424 A1 | 4/2002 | Lee |
| 2005/0113132 A1 | 5/2005 | Irsheid et al. |
| 2005/0250519 A1 | 11/2005 | Samuel |
| 2007/0001813 A1 | 1/2007 | Maguire et al. |
| 2007/0004426 A1 | 1/2007 | Pfleging et al. |
| 2007/0036119 A1 | 2/2007 | Haddad et al. |
| 2007/0046459 A1 | 3/2007 | Silverman et al. |
| 2009/0092049 A1 | 4/2009 | Hargrave et al. |
| 2010/0131567 A1 | 5/2010 | Dorogusker et al. |
| 2010/0195872 A1 | 8/2010 | Velardo et al. |
| 2012/0311149 A1 | 12/2012 | Trevino et al. |
| 2013/0060351 A1 | 3/2013 | Imming et al. |
| 2013/0065603 A1 | 3/2013 | Hovav |
| 2013/0281084 A1 | 10/2013 | Batada et al. |
| 2013/0314210 A1 | 11/2013 | Schoner et al. |
| 2013/0317944 A1 | 11/2013 | Huang et al. |
| 2014/0149004 A1 | 5/2014 | Best et al. |
| 2014/0324615 A1 | 10/2014 | Kulkarni et al. |
| 2015/0003433 A1 | 1/2015 | Sinha et al. |
| 2015/0282113 A1 | 10/2015 | Costa |
| 2015/0296332 A1 | 10/2015 | Lee et al. |
| 2015/0356498 A1 | 12/2015 | Casanova et al. |
| 2016/0012196 A1 | 1/2016 | Mark et al. |
| 2016/0078738 A1 | 3/2016 | Basalamah et al. |
| 2016/0105762 A1 | 4/2016 | Singh et al. |
| 2016/0112886 A1 | 4/2016 | Malik et al. |
| 2016/0117213 A1 | 4/2016 | Arjun et al. |
| 2016/0127883 A1 | 5/2016 | Zhou et al. |
| 2016/0127996 A1 | 5/2016 | Patil et al. |
| 2016/0142868 A1 | 5/2016 | Kulkarni et al. |
| 2016/0163115 A1 | 6/2016 | Furst |
| 2016/0183042 A1 | 6/2016 | Weizman et al. |
| 2017/0041963 A1 | 2/2017 | Edge |
| 2017/0076332 A1 | 3/2017 | Jung et al. |
| 2017/0085417 A1 | 3/2017 | O'Reirdan et al. |
| 2017/0366944 A1 | 12/2017 | Geng et al. |
| 2017/0374690 A1 | 12/2017 | Maddali et al. |
| 2018/0084588 A1 | 3/2018 | Khoury et al. |
| 2018/0160282 A1 | 6/2018 | van de Poll |
| 2018/0160334 A1 | 6/2018 | Deshpande |
| 2018/0367973 A1 | 12/2018 | Bloechl et al. |
| 2020/0100067 A1* | 3/2020 | Wihardja ............... H04W 4/80 |

OTHER PUBLICATIONS

International Search Report and Written Opinion issued for application No. PCT/US2019/023222 dated Jun. 18, 2019.

International Search Report and Written Opinion issued in application No. PCT/US2019/023226 dated Jun. 18, 2019.

Partial International Search Report and Written Opinion issued for application No. PCT/US2019/023228 dated Jun. 14, 2019.

Woolley, "Bluetooth Core Specification 5.1 Feature Overview," Bluetooth, Jan. 2019.

International Search Report and Written Opinion issued in application No. PCT/US2019/058702 dated Jan. 17, 2020.

International Search Report issued in application No. PCT/US2019/068962 dated Mar. 17, 2020.

Partial International Search Report and Written Opinion issued in application No. PCT/US2019/068960 dated Mar. 30, 2020.

International Search Report and Written Opinion issued in application No. PCT/US2018/034827 dated Sep. 18, 2018.

Kluge et al., "Project: IEEE P802.15 Working Group for Wireless Personal Area Networks (WPANs)," Submission, IEEE 802.15-09-0613-01-004f, Nov. 2009.

Vasisht et al., "Decimeter-Leval Localization with a Singe WiFi Access Point," Proceedings of the 13th USENIX Symposium on Networked Systems Design and Implementation, pp. 165-178, Mar. 16-18, 2016, Santa Clara, California USA.

Zand et al., "A high-accuracy phase-based ranging solution with Bluetooth Low Energy (BLE)," IEEE Wireless Communications and Networking Conference, Marrakech, Morroco, Apr. 2019.

* cited by examiner

FROM 560

FROM 1935

Ultrasound Signal Acquisition Timing

BLE NETWORKING SYSTEMS AND METHODS PROVIDING CENTRAL AND PERIPHERAL ROLE REVERSAL WITH ENHANCED PERIPHERAL LOCATION DETERMINATION USING CONSTANT TONE EXTENSION ANALYSIS FOR A SAME CHANNEL

CROSS-REFERENCE TO RELATED APPLICATIONS

This is a continuation-in-part of application Ser. No. 16/450,043 filed Jun. 24, 2019, which in turn in a continuation-in-part of application Ser. No. 16/255,246 filed Jan. 23, 2019, which in turn is a continuation-in-part of application Ser. No. 16/177,915 filed Nov. 1, 2018, which in turn is a continuation-in-part of application Ser. No. 15/626,083, filed Jun. 17, 2017, now U.S. Pat. No. 10,244,373, issued on Mar. 26, 2019, the entire contents of each of such Applications are hereby incorporated by reference, and to which priority is claimed under 35 U.S.C. § 120.

FIELD OF THE DISCLOSURE

Disclosed embodiments relate to wireless communications, and more specifically, to wireless communication among BLUETOOTH Low Energy (BLE) equipped devices in which conventional BLE central and peripheral roles of those devices are reversed and made applicable to nodes of a BLE-enabled network so as to enhance BLE networking capability, including refining determinations of a location of a node operating as a peripheral so as to ascertain that location relative to an area-specific location.

BACKGROUND

Circa 2009, the Internet was in a stage of its evolution in which the backbone (routers and servers) was connected to fringe nodes formed primarily by personal computers. At that time, Kevin Ashton (among others) looked ahead to the next stage in the Internet's evolution, which he described as the Internet of Things ("IoT"). In his article, "That 'Internet of Things' Thing," RFID Journal, Jul. 22, 2009, he describes the circa-2009-Internet as almost wholly dependent upon human interaction, i.e., he asserts that nearly all of the data then available on the internet was generated by data-capture/data-creation chains of events each of which included human interaction, e.g., typing, pressing a record button, taking a digital picture, or scanning a bar code. In the evolution of the Internet, such dependence upon human interaction as a link in each chain of data-capture and/or data-generation is a bottleneck. To deal with the bottleneck, Ashton suggested adapting internet-connected computers by providing them with data-capture and/or data-generation capability, thereby eliminating human interaction from a substantial portion of the data-capture/data-creation chains of events.

In the context of the IoT, a thing can be a natural or man-made object to which is assigned a unique ID/address and which is configured with the ability to capture and/or create data and transfer that data over a network. Relative to the IoT, a thing can be, e.g., a person with a heart monitor implant, a farm animal with a biochip transponder, an automobile that has built-in sensors to alert the driver when tire pressure is low, field operation devices that assist fire-fighters in search and rescue, personal biometric monitors woven into clothing that interact with thermostat systems and lighting systems to control HVAC and illumination conditions in a room continuously and imperceptibly, a refrigerator that is "aware" of its suitably tagged contents that can both plan a variety of menus from the food actually present therein and warn users of stale or spoiled food, etc.

In the post-2009 evolution of the Internet towards the IoT, a segment that has experienced major growth is that of small, inexpensive, networked processing devices, distributed at all scales throughout everyday life. Of those, many are configured for everyday/commonplace purposes. For the IoT, the fringe nodes will be comprised substantially of such small devices.

Within the small-device segment, the sub-segment that has the greatest growth potential is embedded, low-power, wireless devices. Networks of such devices are described as comprising the Wireless Embedded Internet ("WET"), which is a subset of IoT. More particularly, the WET includes resource-limited embedded devices, which typically are battery powered, and which are typically connected to the Internet by low-power, low-bandwidth wireless networks ("LoWPANs").

The BLUETOOTH Special Interest Group devised BLE particularly in consideration of IoT devices and applications which do not rely upon continuous connection(s), but depend on extended battery life. A good example of these devices includes a temperature sensor which intermittently provides temperature readings to a collector device that collects such readings. That is, continuous connection between the sensor and collector is not necessary to obtain, for example, such temperature reading at a discrete point in time.

The BLUETOOTH specification governing operation of BLE devices relates definitional roles to each of the above sensor and collector as peripheral and central, respectively.

In accordance with customary BLE networking operations, a peripheral, such as a sensor above, makes its presence known to any central, such as a collector above, merely by continuously "advertising" its presence. In other words, the peripheral continuously sends beacon advertisement messages for recognition by a central that itself decides whether connection with the recognized peripheral should occur. In a BLE environment, such advertising occurs across three advertising channels, or frequencies, so as to reduce instances of interference among signals sent by multiple peripherals.

Yet, existing within such a BLE environment are several impediments to optimal communication between a peripheral device, such as an end node (EN), and a central device, such as an access point (AP).

An example of such an impediment exists in the form of an uncertainty that a peripheral device may experience in actually knowing why its broadcast advertisement has not been acknowledged by a central device. Specifically, such uncertainty exists due to the peripheral's inability to know whether a central device is in a range enabling receipt of its advertisement, or additionally, whether a central device that is in range is simply overloaded such that it has not had sufficient time or capacity to process the peripheral's advertisement.

Yet a further impediment that exists to an optimal relationship between a peripheral and central is congestion across the advertising channels leading to opportunities for signaling collision and missed advertisements, each of which causes a lack of connection. These failures are prevalent in scenarios in which multiple peripherals are co-located, i.e., disposed in or at a same space within a structure such as a building or other venue in which peripheral and central functionality are required or desired.

A still further impediment to BLE networking exists in the fundamental complexity brought about by the conventional BLE peripheral/central relationship. In this relationship, a mobile peripheral which moves out of range of a central such as a first network access point (AP) to which it had previously connected essentially loses any established relationship that such peripheral made with that first AP. In this case, when the peripheral moves within range of another, second AP, this second AP is not immediately able to know, due to the established relationship of the peripheral with the first AP, whether a connection should be made in view of considerations including network configuration, security and authentication. The only basis for informing the second AP whether connection with the peripheral should occur is information it receives from a coordinating application running on the BLE network and that provides information to APs concerning whether connection should be made with a peripheral as a result of its broadcast advertisement. However, by the time the coordinating application learns of the lost connection with the first AP in the above scenario, a considerable amount of time has elapsed before connection information can be, or is, provided by the coordinating application to the second AP in order to allow it to determine that it should connect with the peripheral. Thus, in these ways, it will be understood that enabling connection with a peripheral moving among several APs is not only complex, but further disadvantages exist insofar as increased connection latency and a higher utilization of backhaul due to necessary information that must flow to and from the coordinating application.

Also, in the context of BLE and other RF communication protocols there sometimes exists barriers to receipt of signaling among intended devices. These barriers may, as alluded to above, be due to natural occurrences such as congestion, or otherwise be defined by artificial structures in the vicinity or vicinities in which operation of the devices is desired. As a consequence, important information which is associated with a respective one or more of the devices, such as its location or other collected and communicable data may be unable to be delivered with optimum efficiency and accuracy. Because of this, operators of systems dependent upon knowing such important information may be denied the capability to carry out intended duties, such as those which may be involved in encompassing project tasks like those of asset tracking and temperature or other variable monitoring, just to name of few.

Thus, it would be desirable to provide for one or more optimized BLE networking relationships that address and overcome the aforementioned impediments and disadvantages now associated with the conventional BLE central/peripheral networking relationship discussed above. More specifically, it would be desirable to provide applicability of such optimized BLE relationships in connection with various application environments such as, for example, providing healthcare, improving fitness, improving internet connectivity, improving proximity sensing, improving alert systems, improving jobsite monitoring, improving systems controlling access, improving automation and improving systems and methods for tracking assets to be inventoried and for which location must be determined, whether in a commercial or residential setting, as well as any other application in which a BLE networking protocol is deployed.

In particular, it would be desirable to provide for such BLE networking relationships so as to enable a determination of a location of a BLE-enabled component tasked with associating or gathering information relevant to one or more of the above-discussed application environments.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

An aspect of the embodiments includes a A BLE communications system, including an end node (EN), an access point (AP) configured to connect to a network and transmit a first beacon advertisement message, and a plurality of reference points (RPs) configured to transmit a second beacon advertisement message. The EN is configured to detect the first and second beacon advertisement messages, initiate a connection with at least one of the plurality of RPs at a first frequency, and transmit a Constant Tone Extension (CTE) to the at least one of the plurality of RPs. The at least one of the plurality of RPs is configured to receive the CTE, and sample the CTE in in-phase and quadrature (IQ) format, transmit the sampled CTE, a signature CTE, and position information to the EN at the first frequency. The EN is further configured to determine a location thereof based on the sampled CTE, the signature CTE, and the position information, and transmit the location via the AP based on a positive evaluation at a time of transmission of the first beacon advertisement message of each of at least (a) whether a proximity of the AP to the EN is a nearest AP proximity and (b) a loading of the network to which the AP is connected.

In certain embodiments, the disclosed embodiments may include one or more of the features described herein.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein.

DETAILED DESCRIPTION

Figure 1:
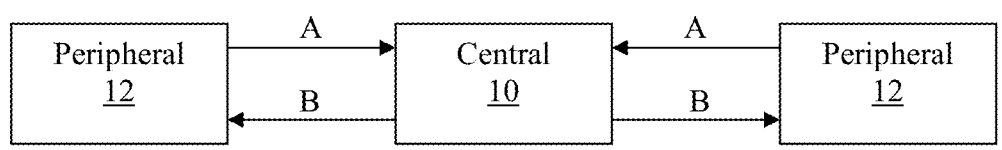
FIG. 1 is an illustration of BLE transmission of a beacon advertisement message between a BLE central and a BLE peripheral, according to the related art.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

BLE networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point (AP), or some other object configured to enable and/or provide BLE communication(s) and which is either stationary or mobile, such as a BLUETOOTH tag. In the context of BLE networking, such devices are prescribed by the BLUETOOTH Core Specification 4.0 and are compatible with IEEE 802.15.1, as appropriate.

Typically, in the context of BLE communications, one or more of these devices assume the roles of a central 10 and a peripheral 12, as shown in FIG. 1. A peripheral is generally understood as a device which merely broadcasts, or advertises, its presence toward another device referred to as a central, with the intent that such presence be detected by that central. The broadcast generally takes the form of a beacon advertisement message transmitted as a radio frequency (RF) signal. Should detection occur, it is also generally understood that it is the central that determines whether a connection with the peripheral should occur. If the answer to that determination is in the affirmative, the central establishes a connection, and also prescribes all conditions under which any connection with a peripheral is to be made. The directional flow of transmission of the beacon advertisement message comprising a RF signal from the peripheral is shown by arrows "A," in FIG. 1, while the directional flow of establishment of a connection with the peripheral by the central is shown by arrows "B."

Such a scheme renders BLE networking susceptible to the many shortcomings discussed hereinabove.

Thus, in an effort to address those shortcomings, embodiments disclosed herein reverse the directional flows of transmission of the beacon advertisement message and connection so as to thereby reverse the roles of a conventional central and a conventional peripheral, and make such role reversal applicable to appropriate nodes in a BLE-enabled network.

Figure 2:
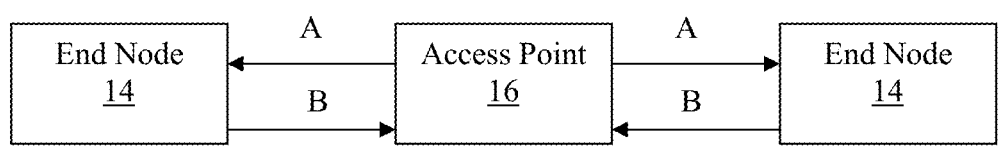
FIG. 2 is an illustration of BLE transmission of a beacon advertisement message between a BLE end node (EN) and a BLE access point (AP), according to embodiments disclosed herein.

FIG. 2 illustrates such reversal of roles insofar as each of exemplary BLE end nodes (ENs) 14 are responsible for detection of a beacon advertisement message transmitted from an exemplary BLE access point (AP) 16 in the direction of arrows "A," and moreover, whereby such ENs 14 are solely responsible for evaluating and/or determining whether to initiate and/or establish a BLE connection with the AP 16, as shown in the direction of arrows "B." That is, in no way is the AP 16 responsible for evaluating and/or determining any aspect or aspects of whether to make a connection between a respective AP 16 and a respective EN 14, and whereas such aspect or aspects, rather, are solely evaluated and/or determined by the EN 14 so that the EN 14, itself, is enabled to then solely initiate and/or establish the aforementioned connection, if doing so is deemed appropriate by the EN 14. Herein, the term, "initiate" means taking any initial steps or enacting any initial procedures, and the terms, "establish," or "established" mean taking any steps or enacting any procedures related to whether to cause and/or maintain a connection between an AP 16 and an EN 14, and thereafter making and/or maintaining such connection.

Figure 3:
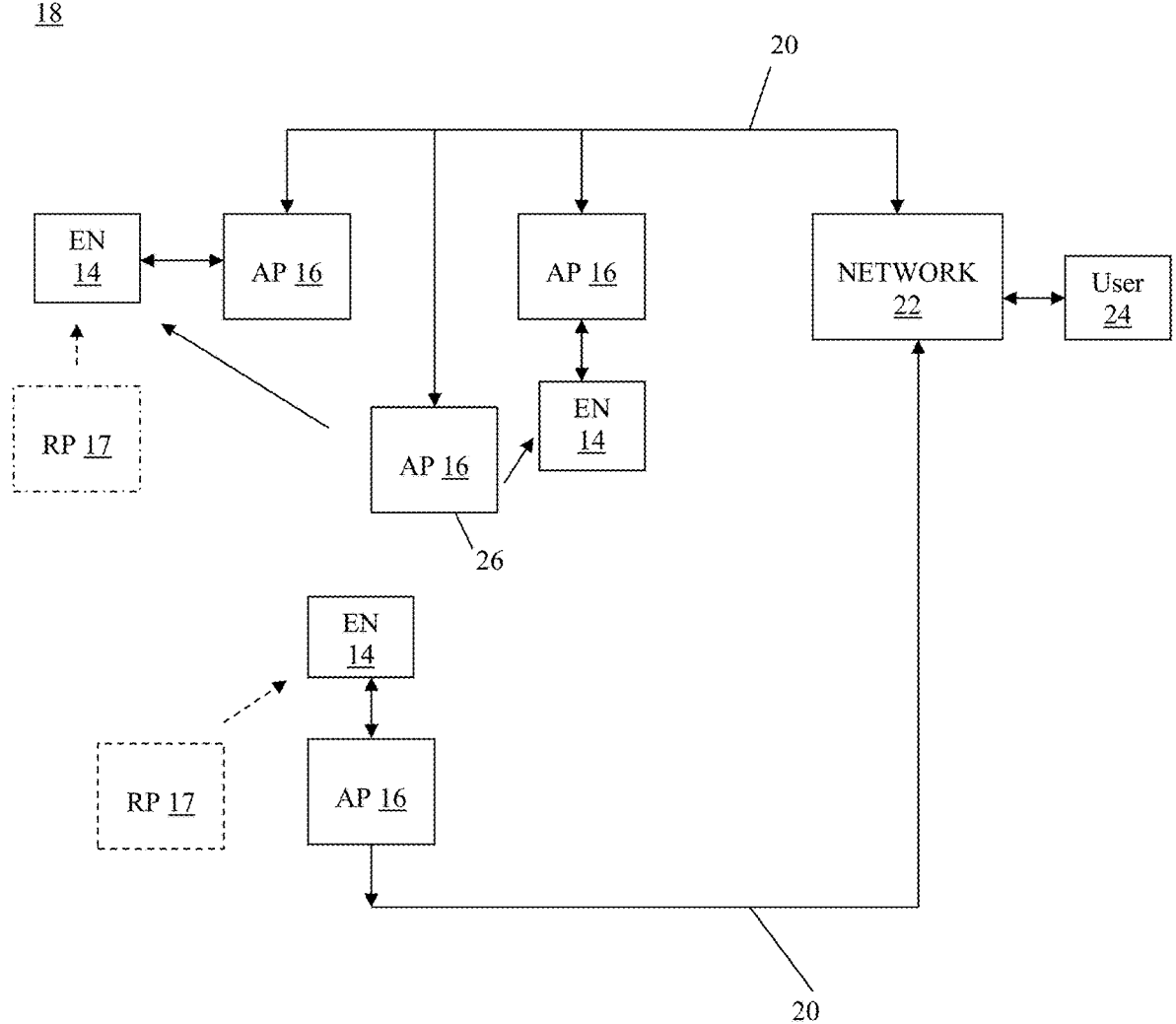
FIG. 3 is an illustration of a BLE-enabled network in accordance with FIG. 2.
Figure 4:
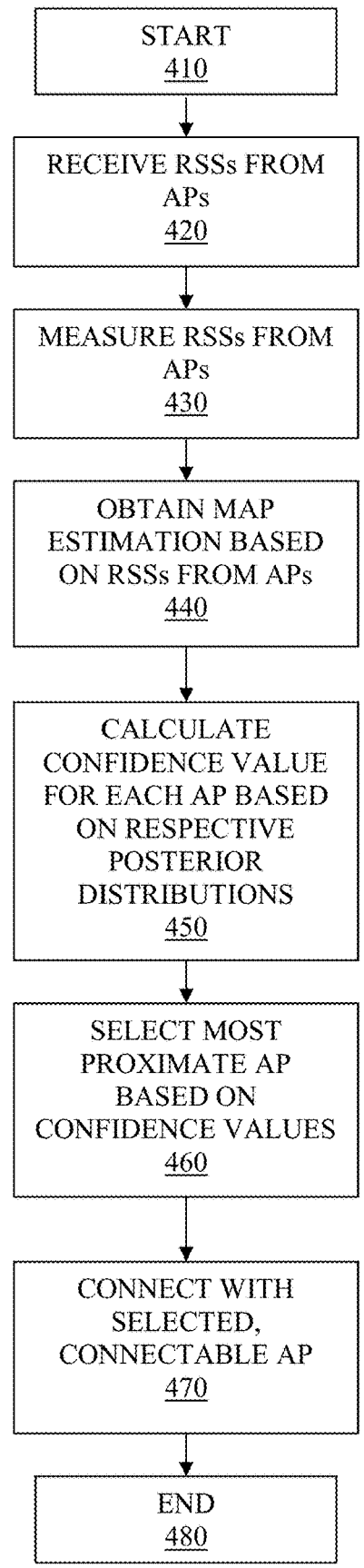
FIG. 4 is a sequence diagram of proximity association of a BLE EN with a BLE AP, in accordance with FIG. 3.
Figure 5:
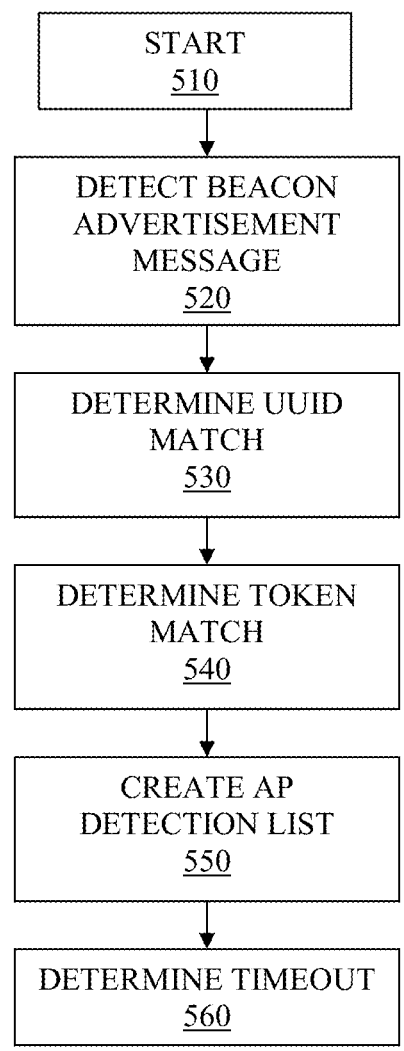
FIG. 5 is a sequence diagram of detection, by a BLE EN, of a BLE AP, in accordance with FIG. 3.
Figure 6:
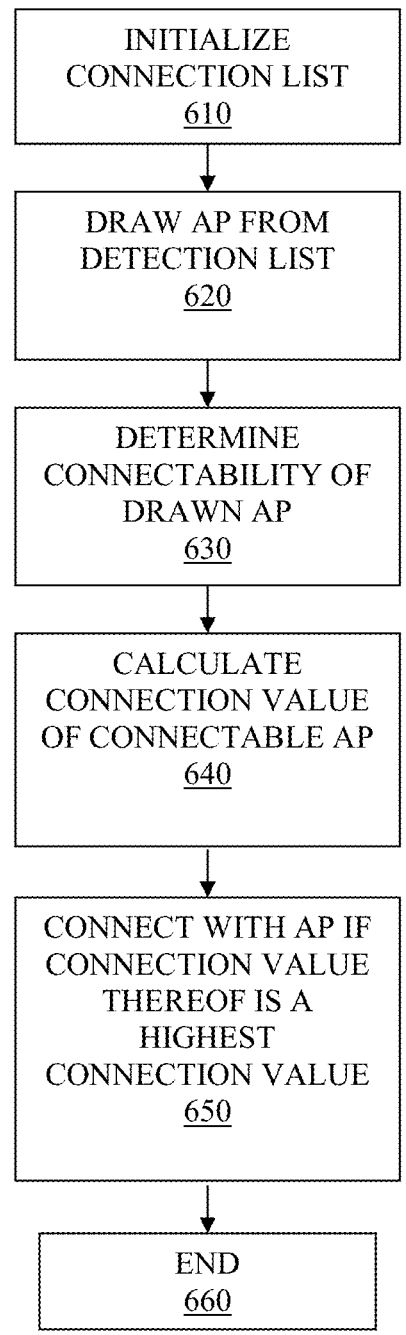
FIG. 6 is a sequence diagram of connection, by the BLE EN, with the BLE AP, in accordance with FIGS. 3 and 5.

FIGS. 3-6 and their accompanying descriptions below address various manner of associating an EN 14 to an AP 16. Therein, FIG. 3 illustrates a BLE-enabled network and communications system thereof, FIG. 4 illustrates a manner of proximity association of a BLE EN to a BLE AP, FIG. 5 illustrates a manner of detection, by a BLE EN, of a BLE AP, and FIG. 6 illustrates a manner of connection, by a BLE EN, with a BLE AP. Throughout, it is to be understood that an EN 14 does not, at any time, transmit to an AP 16 its location, but rather, the location of the EN 14 may be determined by relative association of one or more APs 16 or reference points (RPs) 17.

Specifically, FIG. 3 illustrates a BLE-enabled network 18 and communications system thereof according to the present embodiments in which ENs 14 detect a received signal strength (RSS) of all beacon advertisement messages transmitted from the APs 16, solely determine proximity with respect to the APs 16, and further, solely initiate and establish all connections therebetween the ENs 14 and APs 16, in response to having evaluated and/or made a decision with respect to, for example, such RSS, information contained in the beacon advertisement message, and/or other information, as discussed below in regard to FIGS. 4-6. Once a connection between an EN 14 and an AP 16 is made, data such as, optionally, identifying information, other than location information, of the EN 14 and identifying information of, other than the connected AP 16, the most proximate AP 16, and contained information of the EN 14 including, for example, sensory information thereof, may be transferred to the respective AP 16 for delivery through a backhaul 20, implemented by a cellular, WiFi, or Low Power Wide Area Network (LPWAN) configuration, to a network or cloud service 22 for transfer to an end user terminal 24, such as a personal computing or other electronic device enabled to convey the aforementioned information. Pertinent identifying and/or location information of the APs 16 and RPs 17 are known to the network 22. Such network or cloud service 22 includes any one of available data and connectivity platforms to allow users of nodes within network 18 to, for instance, manage and distribute information pertinent to the nodes and/or information desired in the administration of the nodes. An example of such a platform is CONDUCTOR, available from Link Labs, Inc. of Annapolis, Md.

As mentioned, EN 14 may transmit identifying information, i.e., the media access control (MAC) address, of the AP 16 which is most proximate to the EN 14. Such AP 16 may or may not be an AP 16 which is connectable to the network 22, as is explained below. In these regards, it is to be understood that an AP 16 is connectable if able to connect to the network 22 via backhaul 20, and as non-connectable if unable to make such connection. For instance, non-connectable APs 16 defining RPs 17, which may or may not be present in the network 18 according to FIG. 3, are shown in dashed lines, as are transmissions of their beacon advertisement messages.

Relative to communications between an EN 14 and an AP 16, network 22 is configured to message an EN 14, in order to provision certain ones of settings of the EN 14. Among these settings are aspects of a heartbeat message, i.e., a message sent by the EN 14 to the network 22 which informs the network 22 of the communication state of the EN 14. As examples, such aspects may include one or more of a battery configuration, a heartbeat message interval defining a period of time between transmissions of heartbeat messages, "scans per fix" defining a number of scans to be conducted for every proximity location determination of a most proximate stationary AP 16, as well as any update information in relation to any of the aforementioned aspects. A transmitted heartbeat message will include the MAC address of a most proximate stationary AP 16 and/or RP 17.

Further, it is to be understood that, while communications between an EN 14 and AP 16 are discussed herein in the context of the BLE protocol, it is contemplated that such communication may also be optionally achieved according to another wireless protocol, as appropriate. Also, it is to be understood that EN 14 and AP 16 are exemplary of first and second network nodes, respectively, which may be similarly configured as are EN 14 and AP 16 to carry out communications with respect to the BLE networking described herein and/or according to the other, appropriate wireless protocol discussed above.

In an exemplary case in which a respective EN 14 is mobile, the EN 14 is configured with an estimator comprising appropriate software and/or hardware for causing an estimating of proximity to a given AP 16 or RP 17, based on RSS, and is also configured with appropriate software and/or hardware for performing all operations associated with initiating and/or establishing a connection with an AP 16. All discussion herein regarding a determination of proximity of an AP 16 is to be understood as being equally applicable to determination of proximity of a RP 17.

The estimator conducts a Bayesian Estimation, and specifically a maximum a posteriori (MAP) estimation for each AP 16 encountered by the mobile EN 14 at the time of the encounter, i.e., at the time of receipt of a single or multiple beacon advertisement messages, so as to account for either a single RSS, or alternatively, multiple RSSs. In other words, the MAP estimation may reflect either (1) a single RSS at the time of receipt of a beacon advertisement message from the respective AP 16 or (2) in order to mitigate RF hopping, a predetermined number of consecutive RSSs, e.g., five RSSs, resulting from multiple beacon advertisement messages from the respective AP 16. Furthermore, the EN 14 and its estimator may also be configured to undertake the MAP estimation at any time during operation of the EN 14. The estimation is given by the following Equation (1), $$p(x_t|y_{1:N}) = p(y_{1:N}|x_{1:N}) \int p(x_t|x_{t-1}) p(x_{t-1}|y_{t-1}) dx_{t-1} \quad \text{Equation (1)}$$

In this way, the posterior distribution, $p(x_t|y_{1:N})$, for a given proximity between a particular EN 14 and AP 16 pair at time, t, is determined. In particular, such determination is made by advancing the next most previous posterior, $p(x_{t-1}|y_{t-1})$, from time, t−1, to the current time, t, given $p(x_t|x_{t-1})$. It is contemplated that a variance of the previous estimate, $p(x_{t-1}|y_{t-1})$, is increased by a predetermined rate. Accordingly, a new posterior estimate may be obtained based on all observations by an EN 14 in accordance with Equation (2), as follows:

$$p(y_{1:N} \mid x_{1:N}) = \prod_{i=1}^{N} p(y_i \mid x_i).\qquad\text{Equation (2)}$$

Therein, $x_i$ represents a variable distance from an EN 14 to an AP 16, $y_i$ represents a RSS of a beacon advertisement message and N represents a number of observations, i.e., a number of received beacon advertisement messages. In this regard, the highest value, or minimum variance, distribution is chosen as the MAP estimate.

Once the MAP estimate is obtained, a confidence value, representing a level of expectation that a respective AP 16 is most proximate to the EN 14, is calculated for each AP 16 encountered by the EN 14, based on the estimated posterior distribution and Equation (3) below, and insofar as a 10 dB predetermined variance in RSS is set as an optional, acceptable variance therefor:

$$P_{\overline{10\,dB}} = 1 - 2Q\left(\frac{10\text{ dB}}{\sigma_{posterior}}\right).\qquad\text{Equation (3)}$$

Thus, it is to be understood that another variance level could be set as the predetermined variance depending upon, for example, device configuration(s) of one or more of the AP 16 and EN 14.

Selection of which AP 16 is most proximate to the EN 14 is determined as that AP 16 which yields the highest confidence value. However, if a further AP 16 yields a next most confident value corresponding to a predetermined tolerance for the confidence value, selection of the AP 16 that is most proximate to the EN 14 is determined from among all of the APs 16 which have broadcast a beacon advertisement message received by the EN 14. Still further, a signal strength from a respective AP 16 may be adjusted, in accordance with an adjustment factor included in the beacon advertisement message, to confer exclusive selection thereof by the EN 14, i.e., any other AP 16 whose beacon advertisement message the EN 14 has received is excluded from being considered as being most proximate to the EN 14. It is to be understood, that the estimator of a particular EN 14 may be configured to create a statistical fingerprint of AP 16 associations so as to optimize interpretation of future association patterns.

FIG. 4 sets forth a sequence of the above proximity determination enabling association of a respective EN 14 to a respective AP 16.

Therein, flow begins at decision block 410 and proceeds to decision block 420 at which an EN 14 receives a RSS from one or more APs 16. Thereafter, at decision block 430, the EN 14 measures the RSSs. At decision block 440, the estimator, which is configured integrally with the EN 16, calculates a MAP estimation for each of the RSSs. Subsequently, at decision block 450, EN 14 calculates a confidence value from each of the estimated posterior distributions. At decision block 460, the AP 16 yielding a highest confidence value is selected as the most proximate AP 16 to the EN 14. Flow then proceeds to decision blocks 470-480 in response to the selection by the EN 14. At decision block 470, EN 14 records the selection of the AP 16 according to identifying information thereof, including, for example, its network address or other appropriate networking identifying information. At decision block 480, the proximity association process ends.

Furthermore, it is contemplated that EN 14 may modulate its behavior depending upon certain conditions. For example, EN 14 may vary the frequency with which it conducts its MAP estimate depending upon whether the EN 14 is stationary or moving. That is, EN 14 may perform its estimation more frequently if it is moving, and less often if it is stationary. Still further, EN 14 may be configured to perform some predetermined action depending upon whether it is at a predetermined location (e.g., activate a light-emitting device (LED) or alarm) and/or whether no further AP 16 is detected (e.g., deactivate a device).

Additionally, and in accordance with FIGS. 5-6, the decision as to which AP 16 a mobile EN 14 should connect with, and to which it may transmit the identifying information of the most proximate AP 16, is determined based on attainment of a highest connection value calculated by the mobile EN 14. That is, as a mobile EN 14 moves in proximity to one or more APs 16, the value of connection with any one of the APs is assessed based on several components including the confidence value, in accordance with FIG. 4, and an associated weighting factor, a network loading value and an associated weighting factor, and an association factor of the broadcasting AP 16, and is given by the following Equation (4):

$$\sigma = \alpha\cdot P\cdot\beta\cdot L + \gamma,\qquad\text{Equation (4)}$$

in which $\sigma$ represents the connection value, as an absolute value, $\alpha$ represents a weighting factor assigned to the confidence value calculated by the EN 14, P represents the confidence value, $\beta$ represents a weighting factor assigned to loading of the connected network, L represents a loading value of the connected network and is included in the beacon advertisement message, and $\gamma$ represents an association factor for a respective AP 16, such that $\gamma$ equals zero if the EN 14 has not made a previous connection with the respective AP 16 and equals a predetermined highest value if the respective AP 16 is the AP 16 with which the EN 14 has made a most previous connection.

In this way, an EN 14 that moves among various APs 16, which may or may not be connectable to the network 22, may determine an optimal connection among such APs 16 based on the aforementioned components yielding the highest connection value in accordance with Equation 4.

Once such connection is made, as indicated by the exemplary double arrows of FIG. 3, the connected AP 16 may receive from the EN 14 the identifying information of another AP 16 that is most proximate in a case in which the connected AP 16 has been determined to have attained the highest connection value, but not the highest confidence value. The other, most proximate AP 16 may include another connectable AP 16, indicated at 26 in FIG. 3, to which connection has not been made due to it not achieving the highest connection value. Thus, it is to be understood that the consideration of the confidence value in Equation 4 increases the likelihood that the most proximate AP 16 is the one to which EN 14 connects. However, this scenario is not certain given connectability of one or more APs 16 and other considerations used in determining the connection value according to Equation (4).

The manner of determining the above optimal connection at the mobile EN 14 is demonstrated by the flow of FIGS. 5-6. FIG. 5 provides a sequence for scanning for detection of a beacon advertisement message respectively transmitted from one or more APs 16, while FIG. 6 provides a sequence for determining an AP 16 with which the EN 14 should connect, based on the above-discussed connection value, σ, as determined in accordance with Equation 4.

Flow begins in FIG. 5 at decision block 510 and proceeds to decision block 520 at which EN 14 scans for and detects a respective beacon advertisement message from one or more APs 16, whose identifying and/or location information is known to the network 22. Thereafter, at decision block 530, EN 14 processes a detected beacon advertisement message to determine a Universally Unique Identifier (UUID) match wherein identifying data of the AP 16 broadcasting the beacon advertisement message is confirmed as belonging to the network 22. From there, flow proceeds to decision block 540 to determine and confirm a token match. If a match is confirmed at 540, the broadcasting AP 16 is, at decision block 550, added to a list of detected APs 16 ("detection list") for which decisions at blocks 530 and 540 have been confirmed. During operation of the estimator at decision blocks 520-540, the estimator of EN 14 calculates respective confidence values for the detected APs, and records each of the respective confidence values for the detected APs 16 such that attained confidence value is associated with a respective, detected AP 16 when such AP 16 is added to the detection list, and also its selection of the most proximate AP 16. Thereafter, it is determined at decision block 560 whether the scanning operation has timed out. If not, as in the case of negative decisions at decision blocks 530 and 540, scanning continues. If the scanning operation has timed out, flow proceeds, as shown in FIG. 6, to determine which AP 16, from among the detection list, the EN 14 should connect.

Based on a timeout having occurred and the detection list, flow then proceeds, from decision block 560, to decision block 610 of FIG. 6 so as to initialize a list of APs 16 to which the EN 14 should connect (so as to provide a "connection list"). Once this connection list is initialized, an AP 16, with its associated confidence value, is drawn from the detection list, at decision block 620, at which point it is then determined, at decision block 630, if such AP 16 is connectable to the network 22 of FIG. 3, for example. If the drawn AP 16 is connectable, flow then proceeds, with respect to such drawn AP 16, to decision block 640 whereat a connection value therefor is calculated in accordance with Equation (4). Flow is then iterative through decision blocks 620-640 until detection list provided at decision block 550 is empty. From among respective connection values calculated at decision block 640, EN 14 selects and connects with, at decision block 650, the AP 16 having a highest connection value in accordance with Equation (4), and proceeds to an end at decision block 660 once connection is established.

During that connection, however, identifying information, other than location information, of a RP 17 which is determined to be most proximate to the EN 14 may be transmitted, by the EN 14, to the AP 16 with which the aforementioned connection has been established.

In this way, the aforementioned proximity determination according to the discussed confidence value serves the dual purpose of both determining an estimate of which AP 16 and/or RP 17 is most proximate to an EN 14, and providing a basis for determining which AP 16 the EN 14 should connect. That is, the AP 16 with which the EN 14 ultimately connects may receive identifying information of a non-connectable RP 17 that is most proximate to the EN 14 so that a relative determination of the location of the EN 14 may be determined with reference to this latter, non-connectable RP 17. In this way, the granularity of the proximity determination above is increased such that non-connectable RPs 17, and not only connectable APs 16, are each considered by the estimator of EN 14 so as to render available a more accurate AP/EN proximity association.

Accordingly, as mobile EN 14 moves in and out of range of one or more APs 16, connection with a respective one thereof may be made based upon the aforementioned confidence and connection values, such that the connected AP 16 likewise may yield a highest confidence value so as to be most proximate to the EN 14, and represent the optimal connection according to Equation (4). In this case, such proximity will be made known to the user 24 by virtue of the established connection and the lack of any other AP 16 identifying information being transferred to the network 22.

Such ability of a EN 14 to select and connect with a specified, respective one of APs 16 removes the shortcomings of conventional BLE networking by enabling a mobile EN 14 to have the autonomy necessary to initiate and/or establish connection with an AP 16 solely in response to its own evaluation and decision making with respect to aspects contributing to the aforementioned proximity association, connection value and/or other information associated with the EN 14. For instance, such other information may optionally include one or more parameters relating to operation of the EN 14.

In removing the aforementioned shortcomings, it will be apparent that the embodiments discussed herein eliminate the conventionally overwhelming number of advertisements transmitted by peripherals in conventional BLE networking. That is, the present embodiments substantially reduce the number of advertisements occurring at a given time by virtue of the BLE role reversal, discussed herein, in which plural end nodes receive, rather than transmit, advertisements in the form of beacon advertisement messages from one more access points.

Once connected, the EN 14 may then transfer its own identifying information, other than location information, and identifying information of the most proximate AP 16 and/or RP 17. In this way, when information of an AP 16 other than the connected AP 16 is not transferred, it will be understood that the connected AP 16 is most proximate to the EN 14. Concurrently with the transfer of the above information, the EN 14 may also transfer one or more of its contained information including sensory information, access information, notification information, alarm information, and any other status and/or content information thereof as may be applicable to its particular configuration. For instance, it is contemplated that EN 14 may transfer any of the aforementioned types of information so as to be applicable to such environments including a workplace or other type of commercial environment in which commerce is a purpose, a residence, and a medical facility or other facility in which tracking of persons or objects is necessary and/or desired.

The following examples describe instances of associating a particular end node (EN) 14 to a particular access point (AP) 16. Further, such examples are set forth in the context of the BLE-enabled network 18 of FIG. 3 and with the exemplary understanding that an EN 14, which may be defined as a BLE tag and/or a BLE tag attached to or associated with a particular object, is seeking association with a BLE AP 16 that is configured to report information of the tag to an end user 24 via backhaul 20 and network 22. In these regards, it is contemplated that EN 14 and AP 16 may be embodied as being any stationary and/or mobile nodes of an appropriate wireless network, and as being capable of operating according to a BLE protocol or other protocol in which such nodes may operate as respective first and second nodes according to any of FIGS. 4, 5, and/or 6. Also, in these regards, it is to be understood that a respective EN 14 may be configured to calculate its confidence and connections values at the same time, or, at different times. It is to be understood that EN 14 may undertake any of the processes of FIGS. 4-6 at any time, whether the EN 14 is mobile or stationary. Thus, the EN 14 is configured to optimize, at least, a rate at which connection may be established, with respect to, at least, proximity of such connection as well as the efficiency of such connection, as will be understood based on the components of Equation (4).

In a first instance, it is contemplated that such tag is attached to an object, such as a hospital bed for which it is desirous to know the location thereof at any given point in time when it is moving throughout a hospital environment. Thus, assume that the hospital bed, with the tag attached thereto, is transient throughout the hospital, moving from floor to floor and from room to room, as the case may be when a patient is to undergo a particular procedure. At any given point in time, as the bed moves from one location to the next, its whereabouts may be tracked through monitoring achieved by the BLE communications system disclosed herein.

More specifically, as the hospital bed may move throughout a particular floor, it contemplated that it will move among a number of APs whose location is known to the hospital network. As that travel occurs, the tag attached to the bed will scan for beacon advertisement messages transmitted from the various APs. Upon receipt of the transmitted signals, the tag is configured to conduct the MAP estimation discussed hereinabove and calculate a highest confidence value for the AP that is in closest proximity at a given point in time and which may or may not be connectable to the hospital network. The tag is further configured to connect with a particular connectable AP having a highest connection value, as shown by the exemplary double arrows extending between an exemplary EN 14 and AP 16 of FIG. 3, so that the identifying and other information of the closest proximity AP may then be transferred to the end user. In this way, as the bed and attached tag may continue to move, the process of determining proximity of the tag to both connectable APs 16 and non-connectable RPs 17 continues until, optionally, such point in time when the bed and attached tag are stationary such that identifying information of a further, different AP need not be reported.

More particularly, and continuing with the example scenario above, the attached tag is alternatively, and optionally, configured to conduct a scan of broadcasting APs and assess their UUID and token information so as to qualify those APs to be included on a detection list resulting from the scan and from which connection with a specified one thereof will occur in order to transfer the tag's identity, identity information of the AP to which the tag is most proximate, and/or contained information of the tag to an end user. Once this detection list is compiled and scanning is completed, embodiments of the present disclosure contemplate the tag being configured to initialize a connection list of APs, from among the APs compiled on the detection list. Once initialized, the tag is further contemplated to conduct a determination of whether an AP is connectable to the network 22 via backhaul 20 so as to be able to transfer information of the tag to an end user desirous of knowing the location of the hospital bed. Each connectable AP is then evaluated as to its associated connection value in accordance with Equation (4) above.

More specifically, the connection value for each AP, that is determined to be connectable to the network 22, is assessed based on components comprising a confidence value representing a level of expectation that a respective AP is most proximate to the tag and an associated weighting factor, a network loading value and an associated weighting factor, and an association factor of the AP. In regard to the association factor, it is contemplated that such factor be deemed to have a value of zero if the tag has not connected with the AP being evaluated, and to have a highest value if the tag has had its most recent connection with that AP. In this way, those connectable APs for whom a connection value has been evaluated by the tag will yield an AP having a highest connection value. As such, the tag will then select that AP as the AP with which to initiate and establish a connection enabling the transfer of pertinent information of the tag, including identity information of the AP to which the tag is most proximate, to the end user.

Discussion of the above embodiments contemplates that proximity to either an AP 16 or RP 17 may be determined by an EN's implementation of its estimator, i.e., through execution of Equations (1)-(3). As has been mentioned, inclusion of an RP 17 within these executions greatly increases the granularity of the resulting proximity determinations which enable a final determination of an actual position of the EN 14 at the network 22.

Innumerable settings provide for the opportunity to reap a variety of benefits to be gained from an ability to learn a precise location of assets, such as ENs (and/or objects with which they may be associated). These settings may include factories, crop fields, and buildings such as hospitals. Relatedly, the benefits may include an ability to track when and where materials, resources, and personnel are located at a given time. As a result, optimizations for the following non-limiting examples of scheduling, material allocation, and other types of productivity levels associated with heightening the prospect for attaining desired monetary and procedural goals which are in any way tied to knowing the location of an asset may be further made more obtainable when the accuracy of the asset's actual location is refined.

Many of the above settings would benefit from the placement therein of a plurality of RPs 17 and an ability to more acutely determine a location of an EN 14. Accordingly, embodiments herein contemplate that the EN 14 may be configured to, as an alternative to the estimation(s) provided in accordance with Equations (1)-(3), otherwise determine which of the plurality of RPs 17 is nearest in proximity to the EN 14 by evaluating a coordinate location of each of respective ones of the plurality alongside an evaluation of their RSSs. This way, the alternative estimation performed by the EN 14 enhances the outcome determined in accordance with Equations (1)-(3) by supplementing it with relative positioning for a given RP 17.

Figure 7:
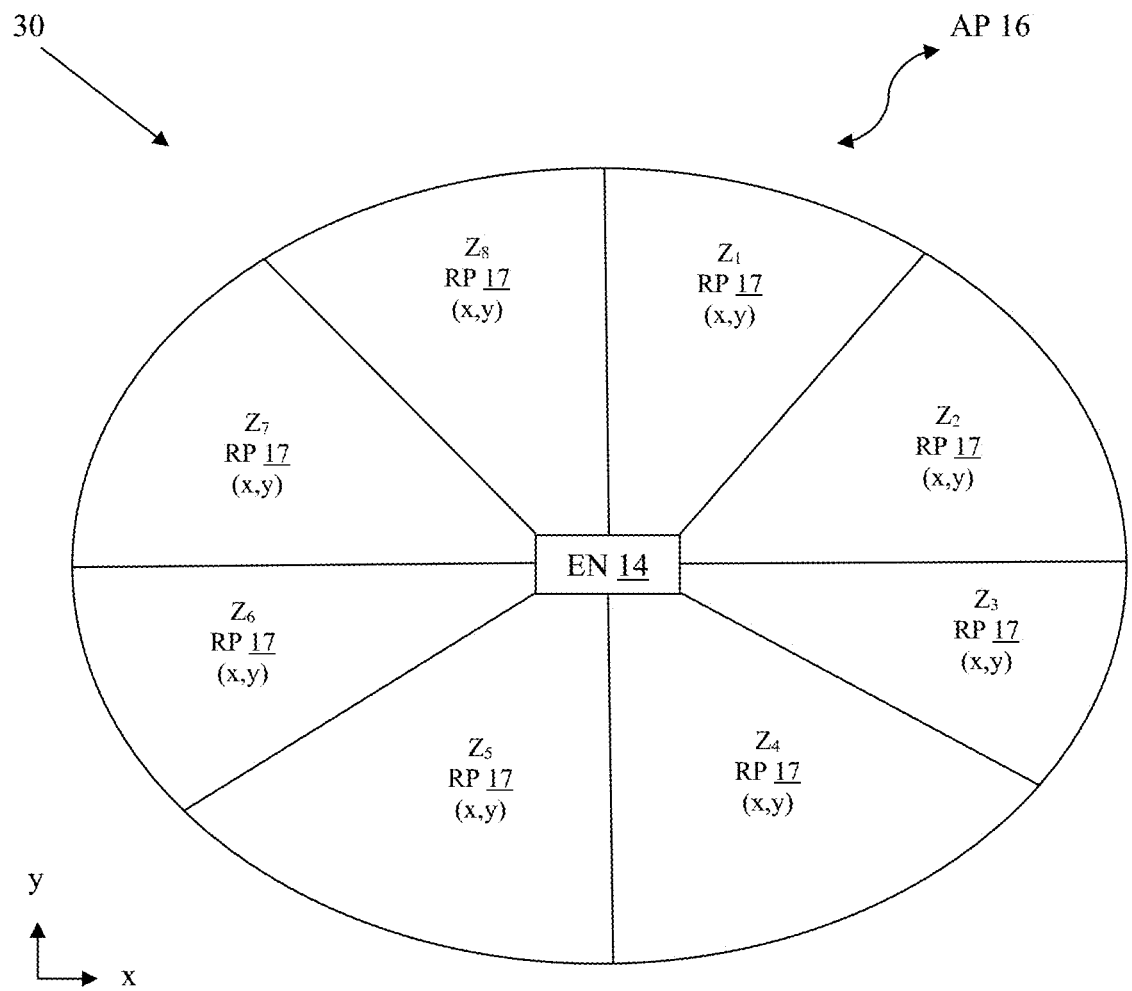
FIG. 7 is an illustration of a zonal configuration of BLE reference points (RPs) relative to which the BLE EN may determine a nearest proximity to one or more thereof, according to embodiments disclosed herein.

Thus, in referring to FIG. 7, there is illustrated an exemplary setting 30, such as may be implemented on a floor of a building whereby an EN 14 is confronted with determining a nearest proximity RP 17 from among a plurality of RPs 17 each of which is separated by an artificial boundary such as a wall. Determining of the nearest proximity is contemplated to reduce distortions in location estimation due to interference caused by such a boundary, or other interference, as the EN 14 moves throughout the floor.

Generally, and for ease of discussion, setting 30 corresponds to a predetermined floor plan having a number of zones (Z) each containing an RP 17 (though more than one RP 17 may be contained within any one zone). Upon activation, RP 17 will initially function as an EN 14 so as to receive, via communication with network 22 through AP 16, its initial provisioning to function as an RP 17. Such provisioning will also include assigning, based on the network's own mapping of RPs 17 within the setting 30, a set of coordinates to the RP 17 to identify the exact location of the fixed location of the RP 17 within the setting 30. As will be understood, the setting 30 may be of any configuration, as will the nature of the coordinates that comport therewith. In the interest of brevity and for purposes of explanation herein, such coordinates of any one RP 17 may be assigned as Cartesian coordinates according to x-y axes made applicable upon setting 30.

With continuing reference to FIG. 7, setting 30 may be divided into an exemplary number of zones $Z_1$ through $Z_8$, though other types of configurations and divisions are contemplated. Although shown as containing a single RP 17 in each zone, it will be understood that multiple RPs 17 may be stationed within a zone in accordance with the particularized layout of setting 30. This way, EN 14 may detect respective beacon advertisements which are broadcast from the one or more RPs 17 so as to estimate a nearest proximity thereto.

As has been discussed, each RP 17 will be associated with its own (x,y) coordinate and zone description according to setting 30 as defined by network 22. In other words, network 22 retains a mapping of each of the RPs 17 according to their (x,y) coordinate and zonal locations, and is enabled to communicate such information to one or more APs 16 operating in and/or relative to the setting 30. For instance, each AP 16 operating within setting 30 may be preloaded, i.e., provisioned by network 22, with RP 17 coordinate and zonal location information.

As EN 14 moves throughout setting 30, it is contemplated that it obtain position information, and specifically the (x,y) coordinate information, of a detected one or more RPs 17, according to one of at least two collection methods. First, the EN 14 may collect the (x,y) coordinate information of any RP 17 as data that is included in any RP advertisement received by the EN 14. Second, each RP 17 may be configured to broadcast, as part of its advertisement, area information indicating that it belongs to, for instance, a particular area or zone, e.g., one of $Z_1$ through $Z_8$, as exemplary of the area information within setting 30, which, as discussed above, may be of any configuration such that the area information may be described other than by zones. Having received the advertisement, the EN 14 may then query the AP 16 for information regarding RPs for the received area or zone, and receive from an AP 16 to which it has connected (according to Equation 4) the coordinate information and corresponding RP association for all RPs 17 located within the received area or zone. Notably, the coordinate information transmitted by the AP 16 may also include a graph of portions of the setting 30 in which there exists an opportunity for allowable path and transitions. Such a graph will be particularly applicable in the instance in which the setting 30 is embodied as a floorplan comprising various arrangements of doorways and hallways, for instance. The query by the EN 14 may be made recursively of the same or a different AP 16 with respect to zones that the EN 14 may successively encounter. The result is that the EN 14 accumulates a mapping of the RPs 17 according to their (x,y) coordinates, whether obtained solely from RP advertisements or from fulfillment of the request(s) by one or more APs 16.

In view of the above, an EN 14 is equipped to estimate the nearest RP 17 within setting 30 based on, with respect to a given one or more RPs 17, both (a) RSS and (b) coordinate information. As such, the estimate conducted by the EN 14 is supplemented by the coordinate information, in contrast to the RSS evaluation discussed above in connection with Equations (1)-(3). Thus, it will be understood that this supplementation represents an alternative EN location estimate relative to the estimate otherwise achieved solely in accordance with Equations (1)-(3).

Calculation by the EN 14 of this alternative estimate may be carried out according to several techniques. They include performing, for a plurality of advertisements received from an RP 17, (A) a determination of a weighted average of coordinate information and RSS to achieve a coordinate estimate of the EN 14 to the RP 17, (B) a determination in accordance with trilateration, and (C) a determination in accordance with simplified trilateration. Each of these techniques is discussed in greater detail below.

(A) Weighted Average of RP Coordinate Information and RSS

Since an EN 14 has at its disposal both coordinate information and RSS for a given RP 17 which it has detected, it makes sense to determine an actual estimate of a coordinate location of the EN 14 within exemplary setting 30. Such an actual estimate of the EN's location is obtainable based on the received coordinates for all the RPs 17 whose advertisements have been received by the EN 14. Once obtained, the actual estimate is compared to each of the received RP coordinates. Based upon this comparison, the EN 14 can then report its location to the best AP 16 connection in terms of the MAC address of the RP 17 whose coordinates are nearest, i.e., most closely match, the actual coordinate estimate determined by and for the EN 14 itself.

Calculation of the estimated EN 14 coordinate is performed individually (and identically) for each x and y component thereof. For instance, the x component is determined with respect to the x coordinate component for a given RP 17, as provided below in Equation (5) as follows:

$$x = \sum_{i=1}^{N} a_i x_{RP,i}, \qquad \text{Equation (5)}$$

in which N represents the number of reference points, $x_{RP,i}$ represents the x component of the RP's coordinate location, and $a_i$ represents a weighting factor assigned to each observation based on the RSS for the given reference point as detected by the EN 14. The weights, $a_i$, are calculated as provided in Equation (6), wherein $$a_{RP,i} = \frac{r_i - r_{min}}{\sum_{i=1}^{N} r_i - r_{min}},$$

in which $r_i$ represents the RSS for a given RP as detected by the EN 14, $r_{min}$ is the sensitivity (in dBm) of the receiver. Throughout, the weights, $a_i$, sum to one, as per Equation (7), wherein $$\sum_{i=1}^{N} a_{RP,i} = 1.$$

(B) Trilateration

In this technique, an EN 14 will employ a path loss model (such as a free space path loss (FSPL) model) to estimate its location in terms of which RP 17 is most proximate. The resultant path loss is assessed for each RP 17 relative to a an appropriate likelihood function, whereby maximization thereof represents the greatest proximity to the EN 14.

More specifically, the path loss (in dBm) may be expressed as follows, per Equation (8), wherein $$P_L = \frac{P_t}{P_r} = \left(\frac{4\pi d}{\lambda}\right)^2,$$

in which $P_t$ and $P_r$ represent the transmit and receive powers of an RP 17 and EN 14, respectively, d (in meters) is the distance between the transmitter and receiver thereof, respectively, and λ (in meters) is the wavelength of the radio emission. Multiplicative effects on the transmission channel, such as body occlusion and structural loss, are combined with occurrences of additive noise.

Figure 7A:
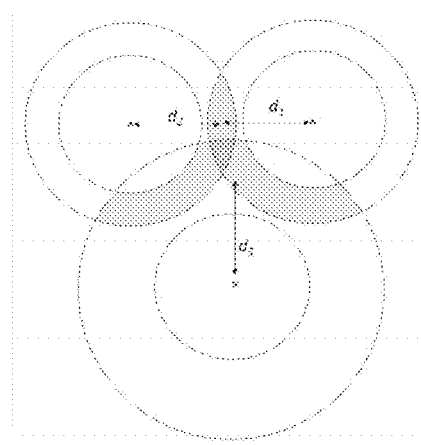
FIG. 7A is a diagrammatic illustration of a nearest proximity determination according to a trilateration technique according to embodiments disclosed herein.

FIG. 7A is a diagrammatic representation of the estimated location of the EN 14 according to the trilateration technique, whereby the location of an EN 14 relative to the transmitting RPs 17 is indicated by the shown intersection.

As shown in FIG. 7A, the distance, $d_i$ is a Euclidean distance relative to the location vector state, e.g., x-y coordinates, of a given $RP_i$, or $L_i$, and the location vector state of the EN 14, θ (as determined continually upon receipt of beacon advertisement messages and expressed in terms of x-y coordinates as measurements of proximity to the transmitter(s)), and is given by Equation (9), wherein $$d_i = \|\theta - L_i\|_2.$$

When rearranged to provide for a respective EN 14 receive power, $P_{r,i}$ (in dBm), and while substituting Equation (9), Equation (8) may be rewritten as Equation (10), wherein $$P_{r,i} = P_{t,i} + 20\log_{10}\left(\frac{\lambda}{4\pi}\right) - 20\log_{10}\|\theta - L_i\|_2.$$

Further simplification of Equation 10, such that $P_{t,i}$ and 20 $\log_{10}$ $$\left(\frac{\lambda}{4\pi}\right)$$

are known, provides consolidation of these known parameters into a constant, α, as shown by Equation (11), in which $$\alpha = P_{t,i} + 20\log_{10}\left(\frac{\lambda}{4\pi}\right).$$

Thus, Equation (10) may be rewritten as Equation (12) and to further include additive noise N, wherein $$P_{r,i} = \alpha - 20\log_{10}\|\theta - L_i\|_2 + N.$$

As such, it will be understood that the observable received power of a transmitting EN 14 is a function of an unobservable vector state, θ, of an EN 14. Therefore, for a given observation, the likelihood function may be expressed as Equation (13), wherein $$p_{R|\theta}(r_i \mid \theta, P_{r,i}) = \frac{1}{\sqrt{2\pi\sigma_{PL}^2}} e^{-\frac{(r_i - P_{r,i})^2}{2\sigma_{PL}^2}}.$$

Further, and in assuming that each observation is considered conditionally independent of another, Equation (13) may be rewritten as Equation 14, in which $$p_{R|\theta}(r_N \mid \theta, P_{r,1}, P_{r,2}, \ldots, P_{r,N}) = \prod_{i=1}^{N} p_{R|\theta}(r_i \mid \theta, P_{r,i}).$$

Accordingly, relative to the above diagrammatic illustration in FIG. 7A representing a location of the EN 14 as the intersection between trilaterated locations from the shown transmitters, a location estimate, $\hat{\theta}_{ML}$, representing a value of θ that maximizes Equation (14), is given by Equation (15), in which $$\hat{\theta}_{ML} = \underset{\theta}{\operatorname{argmax}} \prod_{i=1}^{N} p_{R|\theta}(r_i \mid \theta, P_{r,i}),$$

and may be reduced to either Equation (16) or (17), as shown respectively below.

$$\hat{\theta}_{ML} = \underset{\theta}{\operatorname{argmax}} \sum_{i=1}^{N} \ln p_{R|\theta}(r_i \mid \theta, P_{r,i}) \quad \text{Equation (16)}$$

$$\hat{\theta}_{ML} = \underset{\theta}{\operatorname{argmax}} \; C1 + \frac{1}{2\sigma_{PL}^2} \sum_{i=1}^{N} (r_i - P_{r,i})^2 \quad \text{Equation (17)}$$

Based on the above, the maximum likelihood estimate, $\hat{\theta}_{ML}$, indicating the trilaterated position of an EN 14 may be expressed according to Equation (18), in which $$\hat{\theta}_{ML} = \underset{\theta}{\operatorname{argmax}} \; C1 + \frac{1}{2\sigma_{PL}^2} \sum_{i=1}^{N} (r_i - P_{r,i})^2,$$

which may be further reduced and expressed (through the exclusion of inapplicable parameters) as the following Equation (19) providing $$\hat{\theta}_{ML} = \underset{\theta}{\operatorname{argmax}} \sum_{i=1}^{N} (r_i - P_{r,i})^2.$$

In the above respects, the determined nearest proximity to a RP 17 is evaluated via the above-discussed trilateration in connection with RSS for a plurality of RPs encountered by the EN 14. In these ways, the coordinates provided to an RP 17 may be more acutely interrogated in light of corresponding RSS to narrow an estimation of proximity of the EN 14.

(C) Simplified Trilateration

In an effort to smoothen the resultant likelihood(s) yielded by Equation (14), such implementation of that equation and likelihood(s) rendered thereby may be considered to be a multidimensional Gaussian. In doing so, an evolving multidimensional covariance of a combined Gaussian likelihood is disregarded, such that there is yielded a combined likelihood function having symmetric geometry in the x and y directions, i.e., $\sigma_x^2 = \sigma_y^2$, with correlation coefficients $\rho_{xy}=\rho_{yx}=0$. Accordingly, the standardized two dimensional covariance, relative to a combination of at least a pair of likelihood functions, of $$\sum = \begin{bmatrix} \sigma_x^2 & \rho_{xy}\sigma_x\sigma_y \\ \rho_{yx}\sigma_x\sigma_y & \sigma_y^2 \end{bmatrix}$$

is reduced to $$\sum = \begin{bmatrix} \sigma_{PL}^2 & 0 \\ 0 & \sigma_{PL}^2 \end{bmatrix}.$$

Based on the above, combinations of multidimensional likelihoods, as may be yielded by Equation (14), are simplified to provide series of one dimensional likelihood combinations that are projected onto the dimension between the pair of likelihoods under consideration. Additionally, as a result of the above simplification(s), the maximum likelihood estimate, $\hat{\theta}_{ML}$, may be replaced as the mean of the determined Gaussian likelihood.

Further, it is contemplated that, once having accumulated aggregate coordinate information for setting 30, the EN 14 may employ Equations (1)-(3) to further refine any estimated EN location determined in accordance with techniques (A)-(C). Doing so allows the EN 14 to employ the accumulated knowledge of the setting 30 in order to reactively hone its proximity determination to a given RP 17 when further RP advertisements are received.

Figure 8:
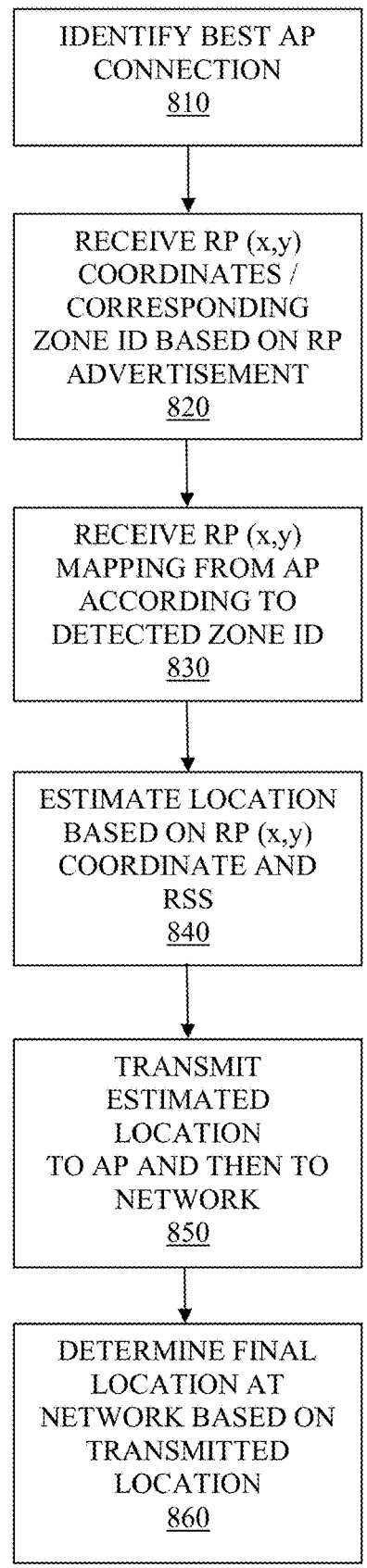
FIG. 8 is a sequence diagram setting forth a manner in which the BLE EN may determine the nearest proximity in accordance with FIG. 7.

Operation of the EN 14 in accordance with the above-described alternative manner of EN location determination with respect to a RP 17 is depicted in FIG. 8. Therein, the operation starts at decision block 810 whereat an EN 14 will identify, in accordance with Equation (4), the best AP connection within, for example, the discussed setting 30. Flow proceeds to block 820 in which the EN 14 will receive, as part of a RP's advertisement, either (a) all of the (x,y) coordinates or (b) the Zone ID, for those RPs 17 which are detectable. At block 830, in response to querying the connected AP 16 for the (x,y) coordinates for RPs within any Zone ID which it has received, the EN 14 receives a mapping of such coordinates to their respective RPs within the identified zone. At this stage, it is likely that, since multiple RP advertisements may mix transmission of (x,y) coordinates alone with identifications of Zone IDs, the EN 14 has accumulated its own RP 17 mapping of those portions of setting 30 which it has traversed. Accordingly, based upon this mapping, the EN 14 is equipped, at decision block 840, to estimate its own coordinates according to its collected RP 17 (x,y) coordinates and their corresponding RSS. At block 850, once the estimate is complete, the EN 14 may then transmit to the connected AP 16 its estimated location (in terms of the particular RP 17 to which it is most proximate according to the estimate of its own EN location). The determination as to which RP 17 is most proximate the EN 14 is made based on the EN 14 conducting a comparison of its own estimated location to the (x,y) coordinates for all those RPs 17 for which it has detected a beacon advertisement message. As a result, the transmitted location will comprise messaging detailing the MAC address of the particular RP 17 that has been determined as being nearest in proximity to the EN 14. The AP 16 will then, at block 860, transmit such MAC address to network 22 for receipt and analysis thereby to verify the EN's estimated location relative to knowledge of the setting 30, and perhaps, prior location estimates reported by the EN 14 in combination with timing of those reports. In other words, network 22 may conduct its own analysis to ensure that the estimated location comports with a predetermined time and distance threshold so as to discard location estimates that may exceed such threshold.

In each of the above-discussed embodiments, it has been advantageous to determine a location of an EN as a function of its proximity to either an AP 16 or RP 17 so as to optimize the variously identified practical applications. Such determinations aid in the carrying out of one or more of those applications particularly when an approximation of that location is satisfactory. However, many situations exist in which it is desirable and/or necessary to know the location of an EN 14 (and/or entity with which it is associated) with greater specificity. Non-limiting examples of these situations may include those in which the whereabouts of personnel and inventory are in question and need to be quickly ascertained in order to address matters of employee production and loss prevention, respectively.

In an effort to track the location of the EN with greater transparency, the following discussion addresses transmitting from a RP 17 both its respective beacon advertisement message as well as an ultrasonic waveform (waveform) to the EN 14, in which analysis of the waveform by the EN 14 is conducted in accordance with a location determination process, such as the above trilateration or simplified trilateration process, to yield a specific EN 14 coordinate location within setting 30, for example. More particularly, based on the EN's knowledge of the x-y coordinates of the transmitting RPs and a determined distance thereto based on the waveform, a x-y coordinate of the EN 14 may be learned and reported via the AP 16 selected to connect with the network 22. Additionally, determination of the location of the EN 14 is further contemplated to yield, as discussed below, a three-dimensional, or x-y-z, coordinate thereof so as to provide, for instance, a height aspect of the location of the EN 14. In this way, such EN 14 location will be able to be ascertained in a case in which setting 30 embodies an exemplary warehouse, and provide detail of the specific placement of the EN 14 on any one of elevated platforms, whether shelving, racking or storage bins, for example.

Figure 9:
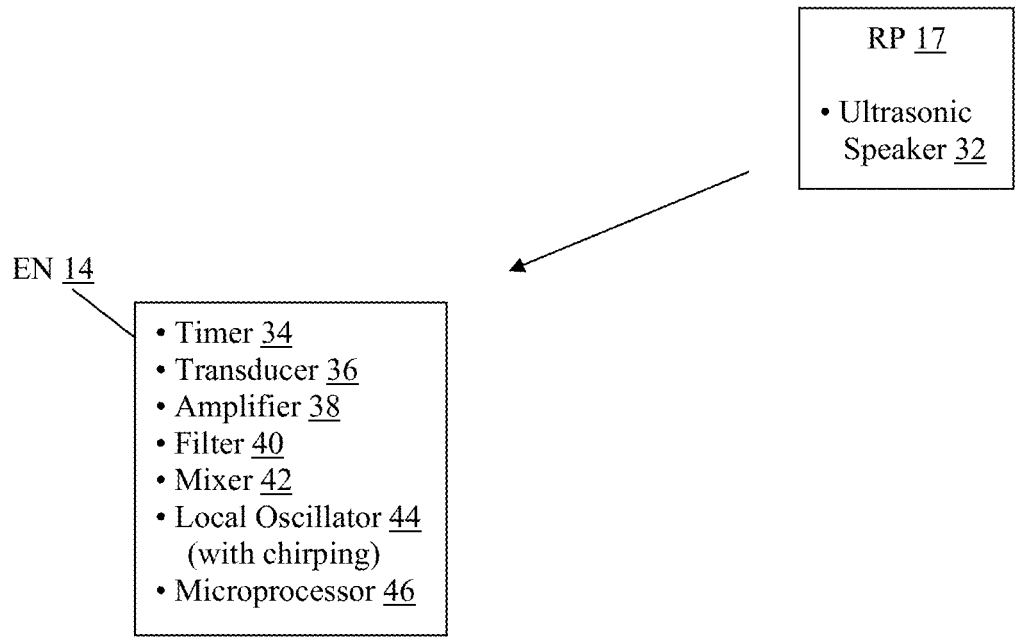
FIG. 9 is a block diagram illustrating an exemplary BLE EN and BLE RP, according to embodiments herein directed to determination of a location of the BLE EN via receipt thereby of an ultrasonic waveform transmitted by the BLE RP.
Figure 10:
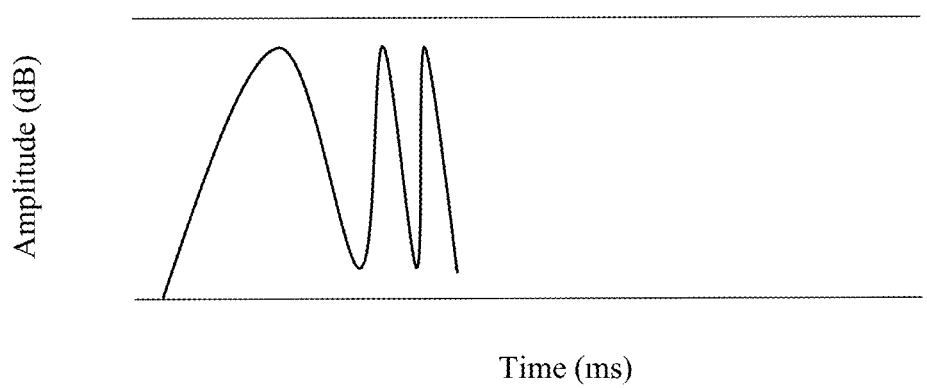
FIG. 10 is a diagrammatic illustration of transmission of the ultrasonic waveform from the BLE RP, according to FIG. 9.

In these respects, FIG. 9 illustrates the components of the EN 14 and RP 17 which are specific to the transmission and receipt of the waveform for enabling determination of the location mentioned above. As shown, RP 17 comprises an ultrasonic speaker 32 configured to announce the waveform. Such waveform is chirped so as to provide for a series of alternating increases and decreases in frequency, with an increasing chirp rate and decreasing chirp duration, as shown in FIG. 10, for example. As is also shown in FIG. 9, EN 14 comprises one or more of each of a timer 34, a wireless microphone and transducer 36, an amplifier 38, a filter 40, a mixer 42, local oscillator (LO) (with chirping) 44, a microprocessor 46, and a memory 47.

Each waveform transmitted from the RP 17 contains various items such as channel coding, chirp parameters setting forth, for example, the variance in chirp rate for chirps of the waveform, as well as durations for pauses between chirps of the waveform.

Upon transmission of the beacon advertisement message from the RP 17, the RP 17 further, and subsequently within a predetermined period of time from transmission of its beacon advertisement message, transmits its waveform. In the interim, and in response to receipt of the beacon advertisement message, the EN 14 activates its timer 34. That is, receipt of the beacon advertisement message triggers an initiation of detection of, i.e., listening for, the waveform by starting the timer 34 at time t0, for instance (assuming no other beacon advertisement message has been received). When the EN 14 receives an initial chirp of the waveform, it marks receipt of that chirp at time t1, for example. This process is repeated for all chirps of the waveform. Thus, for example, based on the differential of t1–t0, the EN 14 may calculate the time of flight (TOF) of the initially received waveform chirp from the RP 17. More specifically, as is explained below, the total TOF of the waveform is determined based on a sum of the temporal offsets for each of the chirps that are received. The aggregation of all temporal offsets for each of the waveform chirps yields the total TOF, which is then multiplied by the speed of sound, e.g., 343 m/s (assuming dry air as the medium), to yield a distance between the RP 17 and EN 14.

It is also contemplated that the beacon advertisement message transmitted from the RP 17 may be configured to include, in an appropriate field thereof, a count-down period defining a transmission delay time, i.e., the predetermined period of time referenced above, for transmitting the waveform. That is, the EN 14 is configured to recognize this period as a frame of time at the end of which the RP 17 will transmit its waveform after first having transmitted its beacon advertisement message. For instance, the count-down period may be 10 seconds (s), or another predetermined period of time. As such, EN 14 will activate its timer 34 at time t0' representing, in the above example, 10 s after receipt of the beacon advertisement message. In this way, power consumption of the EN 14 is optimized whereby the EN 14 may lay dormant during the period of time between receipt of the beacon advertisement message from the RP 17 and the elapse of the count-down period.

Chirping of the waveform enables its TOF to be segmented according to the configured chirps. Accordingly, each incremental portion of the waveform demarcated by chirps may be analyzed to derive partial TOF measurements. This way, factors which may otherwise influence a degradation in measurement of the accuracy of total TOF as well as the distance determined therefrom, such as path loss, may be mitigated.

Figure 11:
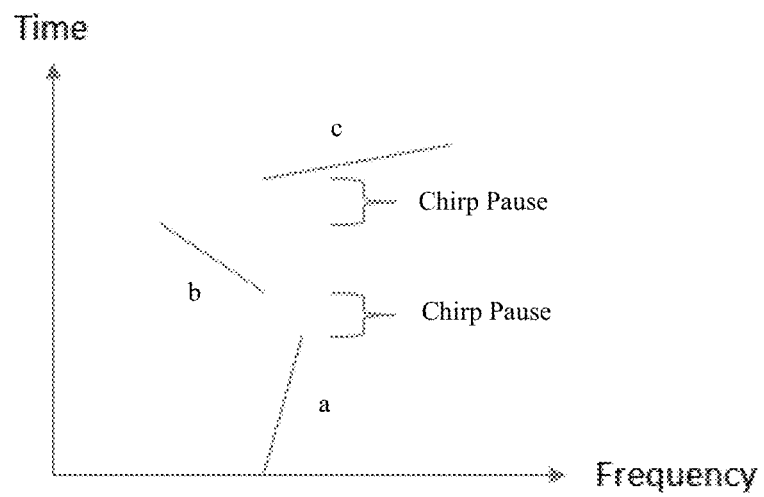
FIG. 11 is a diagrammatic illustration of a relationship between time and frequency at a time of receipt of the ultrasonic waveform by the BLE EN.

In referring to FIG. 11, there is shown a series of chirps a, b, and c of the waveform of FIG. 10 which are separated by corresponding chirp pauses indicative of a shifting in frequency of the waveform. As indicated, sequential chirping of the waveform is provided in which chirp a represents an increase in frequency, and is separated by a chirp pause at the transition of chirp b representing a decrease in frequency, and which is separated by a chirp pause prior to chirp c representing a subsequent increase in frequency. Because of the chirping of the waveform, TOF measurements corresponding to the chirps may be obtained incrementally, such that the aggregation of the measurements yields a total TOF, as is discussed in more detail below.

As noted above, EN 14 comprises a LO 44. The LO 44 is likewise configured to chirp its generated signal. Upon generation of the LO 44 signal, the ultrasonic waveform, and specifically chirps thereof, are compared to chirps of the LO 44 generated signal. Additionally, upon receipt at the EN 14, the waveform is mixed with the chirped signal of the LO 44 so as to de-chirp the waveform and to produce a series of single-frequency tones which may be measured by microprocessor 44 via a Fast Fourier Transform (FFT). Notably, echoes received as a result of successive chirps are blended over a frequency range resulting from the mixing.

Figure 12:
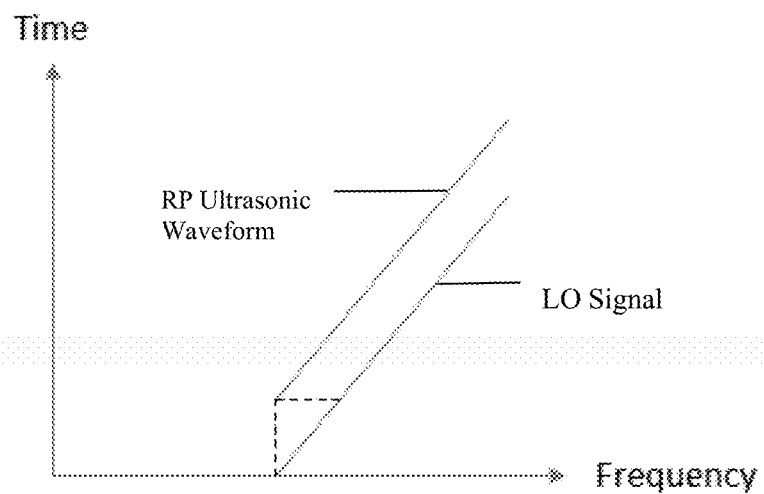
FIG. 12 is a sequence diagram setting forth a manner in which the BLE EN determines a distance from the BLE RP in response to transmission of the ultrasonic waveform therefrom.

As shown in FIG. 12, and since that the LO 44 is started upon detecting an initial chirp of the waveform, it will be understood that chirps of the waveform are delayed, i.e., temporally offset, from the starting of the LO 44, by their respective transit time from the RP 17 to the EN 14. As is further shown by the dotted line relationship, a difference in chirp frequency of each of the waveform and the signal generated by the LO 44 is directly related to the temporal offset. In other words, the chirp rate of the waveform, or the rate at which the waveform changes frequency, defines the direct relationship between the temporal offset and the difference in frequency between the indicated waveform and LO 44 signal.

Because of this relationship, each measured temporal offset between successive chirps of the waveform together with the chirp pause therebetween are used as a gauge for determining the restarting of the LO 44 in anticipation of receipt of a next chirp. Thus, as the waveform proceeds with increasingly faster chirps, timer 34 marks a respective, successive temporal offset for each chirp. Timer 34 is adjusted by the chirp pause (the duration of which is transmitted in the beacon advertisement message). This way, an accuracy of the offset measurement is ensured, such that the sum of the respective offsets equals the total TOF of the waveform.

Throughout each chirp pause occurring during the entirety of the waveform, each of the corresponding temporal offsets is calculated by microprocessor 44 and saved in a non-volatile or volatile memory 46. As each chirp is received, this process is repeated. Alternatively, in order to determine whether the EN 14 is within a predetermined range of the transmitting RP 17, a predetermined number of chirps may be processed (in order to reduce a processing burden and resultant energy consumption at the EN 14).

Based on the above discussion, the determined distance to the RP 17, as derived from the TOF of the waveform, may also be achieved with respect to multiple RPs whose beacon advertisement message and ultrasonic waveform are received at the EN 14. Also, it will be understood that the processes of determining TOF and corresponding RP-EN distance may be carried out for multiple transmissions of beacon advertisement messages and waveforms from a particular RP. Further, since the EN 14 will be equipped with the knowledge of the x-y coordinates, a third dimensional z coordinate may also be ascertained, as discussed below, for the RPs 17, whereby the location determination may be exemplified by a least squares approach to enable the EN 14 to substantially pinpoint a 3D coordinate location thereof. Thus, whether the EN determined coordinate location is determined as either 2D or 3D in its form, such coordinate location, instead of a proximity to an RP 17 reported as the MAC address thereof, may then transmitted by the EN 14 to the network 22 via the connected AP 16.

With the ability to obtain such detail in location determination, the EN 14 is configured to provide end users a specificity of its whereabouts which aids in narrowing information needed to accomplish the applications and associated tasks discussed herein. As such, monetary and other benefits which may be derived from learning this narrowed information may be optimized.

Figure 13:
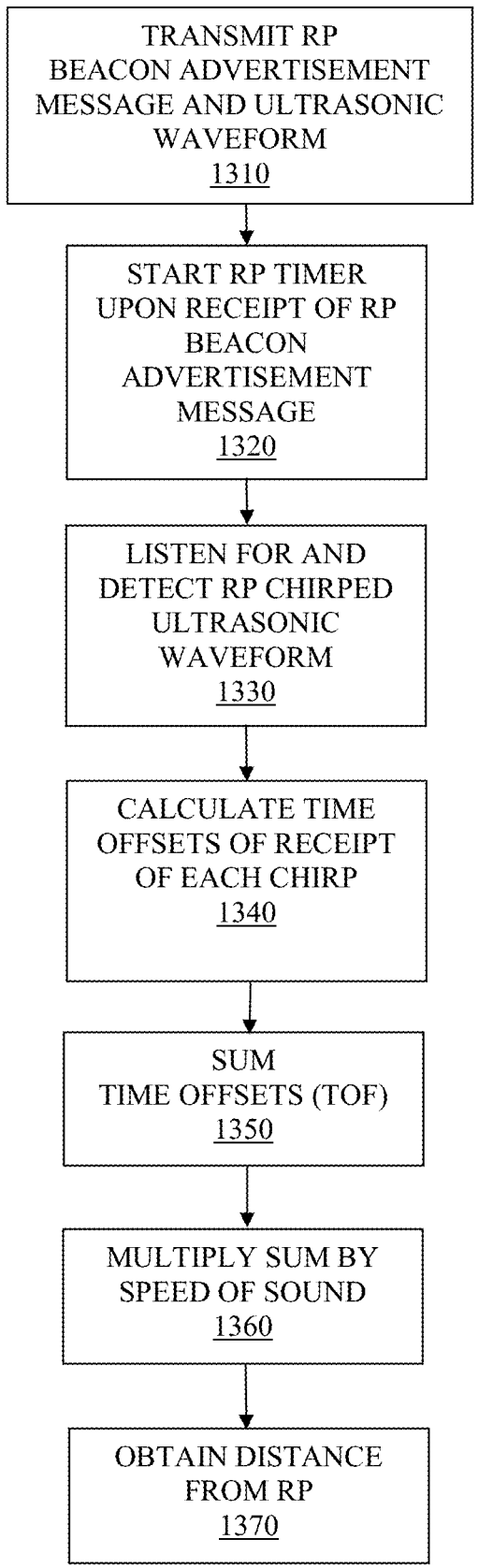
FIG. 13 is a sequence diagram setting forth a manner in which the BLE EN determines its location within a coordinate system as a result of receipt of transmissions of multiple ultrasonic waveforms.

In referring to FIG. 13, there is illustrated a process for receipt of a beacon advertisement message from a respective RP 17, and for determining a distance from the RP 17 to the EN 14, in accordance with the foregoing discussions. The process begins at 1310 in which the RP 17 transmits its beacon advertisement message, and then shortly thereafter its ultrasonic waveform. At 1320, the EN 14, in response to receipt of the beacon advertisement message, starts its timer 34 and begins listening for the ultrasonic waveform at 1330. As shown in FIG. 10, the waveform begins with longer, slower chirps enabling the EN 14 to acquire the waveform over a longer period of time. Throughout progression of the waveform, the EN 14, as indicated at 1340, calculates temporal offsets owing to chirps of the waveform and generated signals of the LO 44. These offsets are then summed at 1350 to generate a TOF of the waveform. Based on the generated TOF, the same is multiplied by the speed of sound at 1360 to arrive at a distance between the RP 17 and the EN 14 at 1370. As has been discussed above, it will be understood that the generated TOF and corresponding RP 17-EN 14 distance based thereon may be calculated according to a given number of chirps. Further, it will also be understood that an increasing chirp rate of the waveform will yield a narrowing of the ranging to the RP 17 as the waveform is transmitted.

Figure 14:
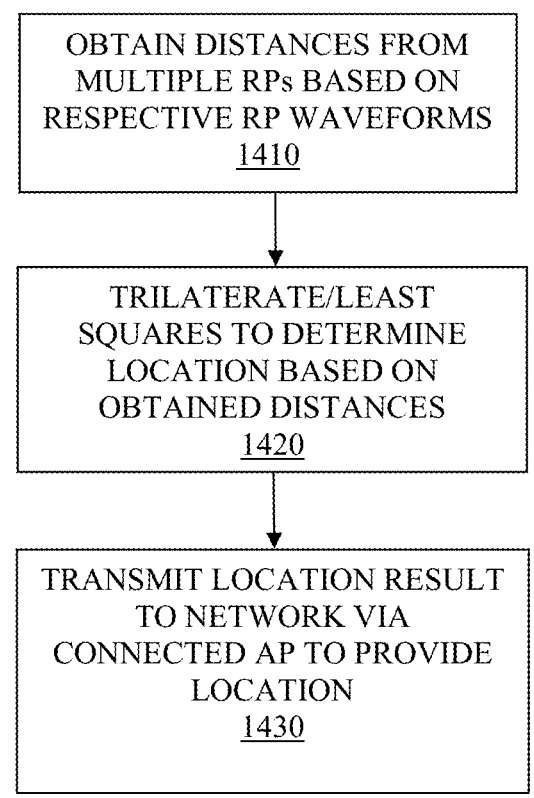
FIG. 14 is a sequence diagram setting forth a manner in which the BLE EN determines its coordinate location according to FIG. 13.

Relative to the receipt of multiple beacon advertisement messages and ultrasonic waveforms from respective ones of RPs 17, FIG. 14 illustrates a process for determining a coordinate location of the EN 14 within a setting, such as setting 30, in which the EN 14 and the RPs 17 operate. Thus, at 1410 the EN 14 obtains the distances to each of the RPs 17 based on their respectively transmitted waveforms. At 1420, the EN operates to determine its coordinate location based on the obtained distances. At 1430, the EN 14 transmits the determined coordinate location to the network via its connected AP 16.

In connection with the above discussion of the TOF determinations measured by a respective EN 14, the present embodiments contemplate that, in an instance in which waveforms from a plurality of RPs 17 are received, determination of the location of the EN 14 may instead be achieved via a least squares approach. Such an approach may be necessary in which RF reception is hampered/disallowed due to any number of scenarios, including structural obstruction within, for example, setting 30. In these regards, waveforms from at least three RPs 17 are necessary to yield a two dimensional (2D), i.e., x-y, location, while waveforms from at least four RPs 17 are necessary to yield a three dimensional (3D), i.e., x-y-z, location. The least squares solution may be embodied in accordance with the equations below, in which the vector solution minimizes squared error.

$$A\vec{x} = \vec{b}$$

$$\vec{x} = (A^T A)^{-1} A^T \vec{b}$$

Relative to the above, it will be understood that matrix A may be configured in an exemplary manner, as below, to reflect a series of two columns if a 2D location is to be yielded, and alternatively, a series of three columns if a 3D location is sought via the z vector solution. Correspondingly, and as also shown below, vector $\vec{b}$ will be configured to include as many rows as there are RPs to consider, i.e., whose waveform has been evaluated by the relevant EN 14.

$$A = \begin{pmatrix} x_2 - x_1 & y_2 - y_1 & z_2 - z_1 \\ x_3 - x_1 & y_3 - y_1 & z_3 - z_1 \\ \vdots & \vdots & \vdots \\ x_n - x_1 & y_n - y_1 & z_n - z_1 \end{pmatrix},$$

-continued $$\vec{x} = \begin{pmatrix} x - x_1 \\ y - y_1 \\ z - z_1 \end{pmatrix},$$

$$\vec{b} = \begin{pmatrix} b_{21} \\ b_{31} \\ \vdots \\ b_{n1} \end{pmatrix}$$

Figure 15:
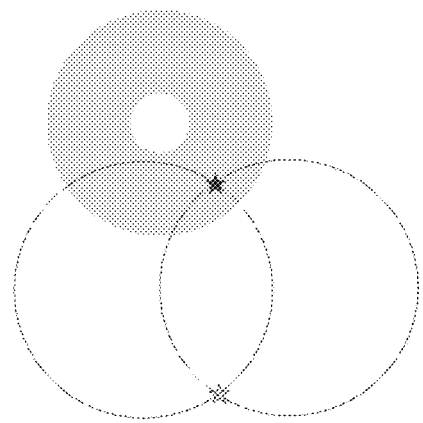
FIG. 15 is a diagrammatic illustration of a manner in which the BLE EN coordinate location may be determined in view of a first instance of aggregated time of flight (TOF) and received signal strength (RSS) data.

In instances in which insufficient TOF data is available, it is also contemplated that such insufficient data may be compared as against the location determinations achieved through the RSS trilateration and simplified trilateration techniques discussed above. When employing this comparison, the EN 14 will analyze which trilateration solution best matches acquired TOF data to resolve the location of the EN 14. Matching in this case may be in accordance with a predetermined threshold so as optimize the desired resolution. For example, such resolution in shown diagrammatically in FIG. 15 in which the TOF solutions are depicted by stars, and wherein the emboldened one thereof represents the true location of the EN 14 since it is within the trilaterated location determination performed based on RSS, relative to the depicted observations.

Figure 16:
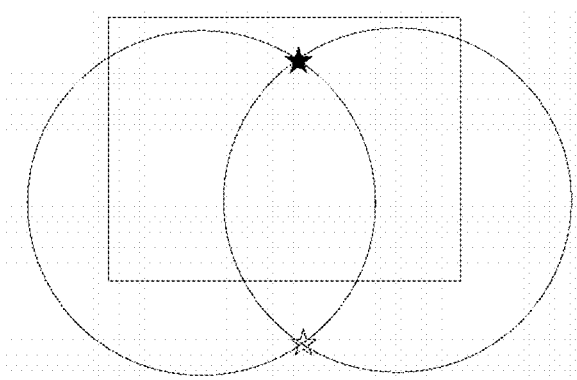
FIG. 16 is a diagrammatic illustration of a manner in which the BLE EN coordinate location may be determined in view of coordinate information for BLE RPs defined within a floorplan within which the BLE EN is operable.

Furthermore, and since an EN 14 will be equipped with coordinate information of those RPs 17 defining the scope of setting 30, such coordinate information may be used by an EN 14 to discard a TOF solution which lies outside the setting 30. This is shown diagrammatically in FIG. 16 in which the rectangle represents setting 30 and the selected TOF location of the EN 14 is represented as the emboldened star since it lies within the setting 30. That is, the TOF location, which is also represented diagrammatically as a star, but nearer the bottom of the diagram, is discarded since in falls outside the setting 30 as defined in part by the coordinates of the transmitting RPs 17.

Figure 17:
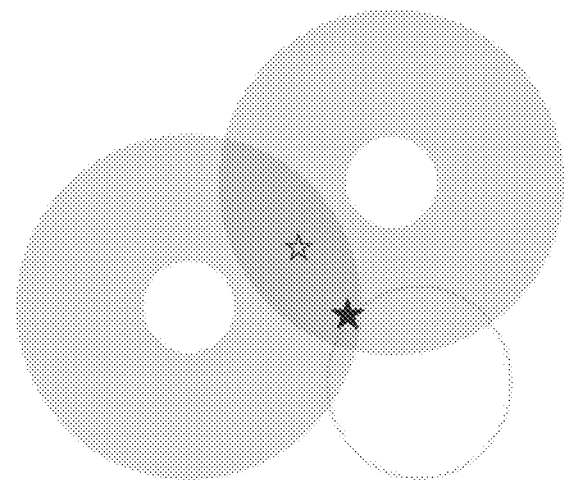
FIG. 17 is a diagrammatic illustration of manner in which the BLE EN coordinate location may be determined in view of a second instance of aggregated time of flight (TOF) and received signal strength (RSS) data.

It is also the case that an EN's RSS based location determination may be further refined through use of a TOF solution. Employing such a confirming technique is particularly useful as RSS observations may be deteriorated due to factors such as noise. More specifically, confirmation may be obtained by combining RSS and TOF likelihoods as in Equation (14) above, relative to a mapping of such likelihoods to the relevant polar coordinates, i.e., range and angle. FIG. 17 diagrammatically illustrates the most likely location of the EN 14 in the form of a hollowed star when informed by only RSS data drawn from given RPs 17 (shown as the thickened spheres). When supplemented by the TOF likelihood (as shown by the thinner of the three spheres), the actual location of the EN 14 may be determined as the location (as depicted by the emboldened star) that intersects the range of location determinations corresponding to each of the RSS observations (as depicted by the shaded spheres) and the TOF observation (as depicted by the thinned ring intersecting each of the spheres).

In these ways, it will be understood that the embodiments disclosed herein optimize the efficiency of a BLE-enabled network by, at least, reducing burdens on network resources, as well as by enhancing the likelihood of connection in situations in which multiple end nodes are co-located. It will likewise be understood that the embodiments disclosed herein enable a determination of each of the relative location of an end node in view of its proximity to an access point, and its coordinate location with respect to one or more reference points.

It will be understood that each of the APs 16 and RPs 17 described herein may be configured to include directional and circularly polarized antennas to, respectively, better focus their broadcasts and reduce cross polarization loss sometimes experienced with vertically polarized antennas. This way, EN 14 location determinations may be achieved with increased accuracy.

As will also be understood from the breadth of the discussion(s) herein explaining various manner in which a location of an EN 14 may be discovered as a function of (a) proximity to an AP 16 or RP 17 and/or (b) a specific area coordinate, it may sometimes be advantageous to simply learn whether such an EN 14 is located, more generally, within a given area, and to do so with minimized cost(s) by reducing the number or amount of components needed to obtain that location result. For instance, it may be useful to obtain such a generalized level of location information in situations in which there is an expectation that material, such as inventory or personnel, be present at the location at a given time, and whereby verification of fulfillment of that expectation is desirable through association with a given EN 14.

In an effort to obtain such verification with greatest ease, it has been recognized that a location of the EN 14 for the above purposes may be learned with heightened reliability by leveraging the inability of an ultrasonic signal to propagate through solid structure such as walls, and doors, etc. As a result, the location of the EN 14 may be learned through a verified association with the ultrasonic signal when transmitted from a single source thereof. In this context, therefore, non-limiting examples of the aforementioned location may include any room or arrangement(s) of commercial and/or non-commercial spaces in which the propagation of the ultrasonic signal is prevented.

Figure 18:
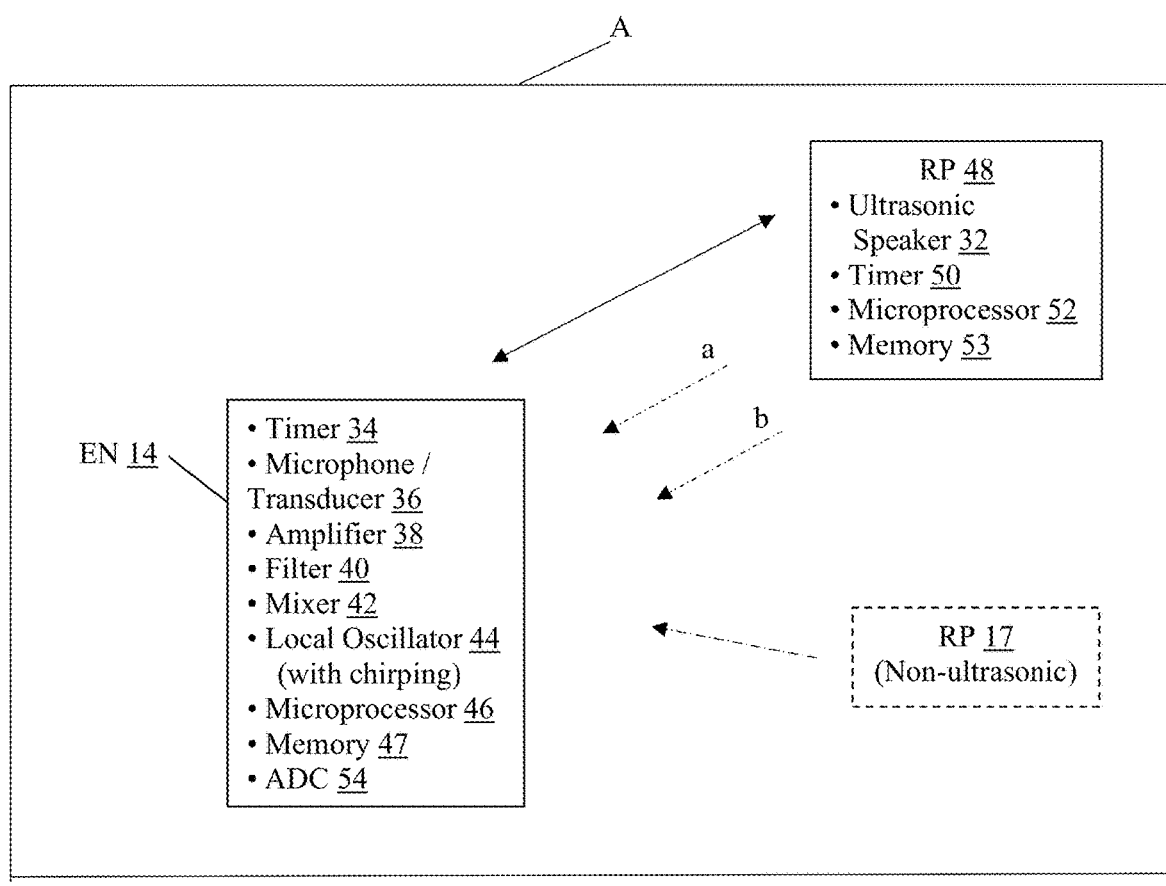
FIG. 18 is a block diagram illustrating an exemplary BLE EN and BLE RP, according to embodiments herein directed to determination of a location of the BLE EN via receipt thereby of an ultrasonic waveform transmitted by the BLE RP in connection with BLE communications between the BLE EN and BLE RP.

In connection with the aforementioned recognition, FIG. 18 illustrates, within an exemplary room setting "A" of, for example, setting 30 (as is shown in FIG. 7), BLE communications between an EN 14 and a RP 48 enabled to emit an ultrasonic signal. Further shown is an RP 17 which is not capable of emitting a ultrasonic signal and which may or may not be present (as is indicated by dashed lines). As will be understood with reference to FIG. 9, EN 14 comprises a similar construction as is shown therein and is complemented by an analog-to-digital converter (ADC) 54. Contrastingly, the ultrasonic signal emitting RP 17 of FIG. 9 is complemented by a timer 50, a microprocessor 52 so as to define the ultrasonic signal emitting RP 48 or UERP 48, and memory 53. Still more, EN 14 and RP 48 are configured to engage in BLE communications (as indicated by the double-sided arrow therebetween), whereby EN 14 may initiate a connection with RP 48, and RP 48 may respond to requests and inquiries transmitted by EN 14. As is shown, a result of such communications includes, as is discussed below, exemplary periodic emissions "a" and "b" of an ultrasonic signal encoded by/with a pseudo-random sequence (PRS) derived from the MAC ID of the RP 48. As will be understood, the aforementioned emissions will be announced via the ultrasonic speaker 32 of RP 48, and received at the EN 14 via transducer/microphone 36. As will further be understood, each of EN 14 and RP 48, in conjunction with their constructions as detailed herein, are configured with all appropriate software and/or hardware necessary for implementing their respective BLE communications and/or their transmission, receipt and processing of ultrasound signaling.

Depending on the configuration of setting 30 and its rooms "A" as may be provided therein, EN 14 may encounter various RPs including RPs 17 without ultrasound capacity and one or more RPs 48. With this is mind, and as is discussed in detail hereinabove, EN 14 is configured to compile, through execution of Equations (1)-(3), a listing of those RPs 17 and/or 48 which are most proximate the EN 14 in response to an evaluation of RSS corresponding to their respectively transmitted BLE beacon advertisement messages. In this regard, it is contemplated that beacon advertisement messages transmitted by RP 48 will be field coded so as to indicate that ultrasound emission capacity exists.

Figure 19A:
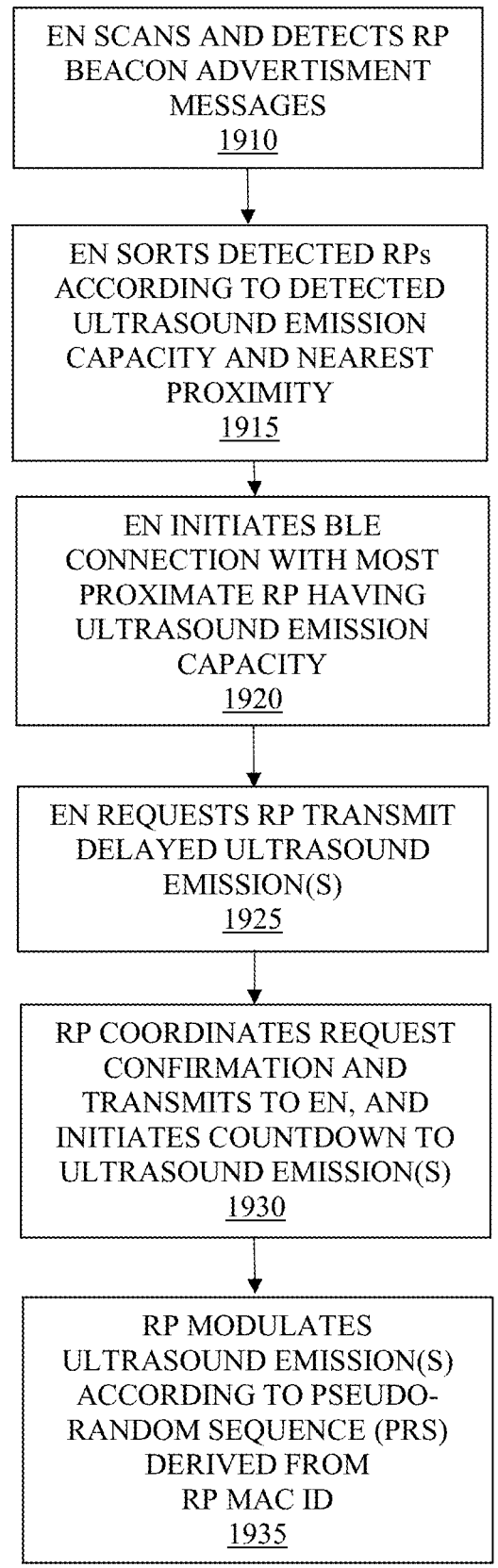
FIGS. 19A and 19B illustrate a sequence diagram setting forth a manner in which the BLE EN undertakes a location determination thereof relative to the BLE communications of FIG. 18.
Figure 19B:
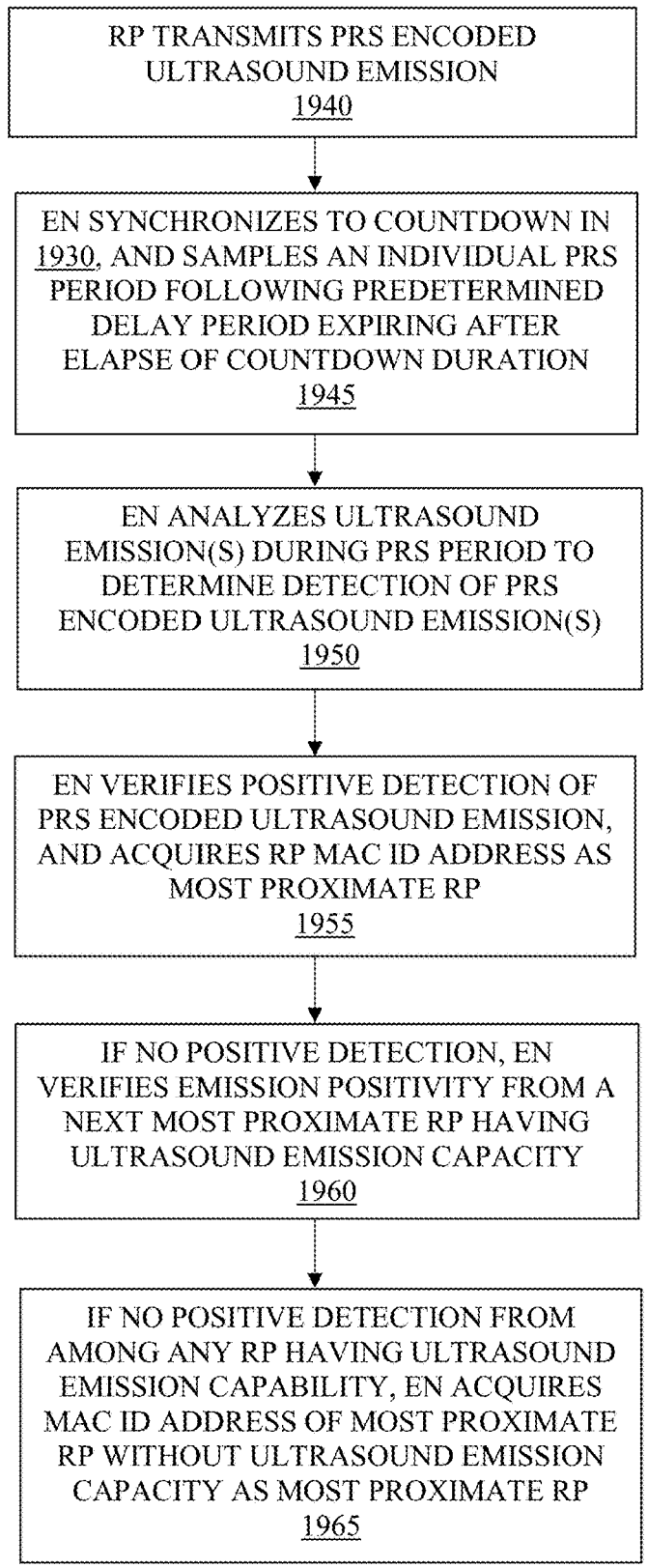

Thus, with reference to FIG. 19, there is illustrated a high-level description of a process by which an EN 14 interacts with one or more RPs 17 without ultrasonic signal emission capacity and one or more RPs 48, such that the EN 14 is able to determine its relative proximity to an RP 17 or RP 48.

Referring again to movement of the EN 14 throughout the setting 30, which may comprise any number of bounded spaces such as rooms and other similarly configured spaces, EN 14 at 1910 conducts its usual scan and detection of RP beacon advertisement messages. Assuming detection of one or more RPs 17 without ultrasonic signal emission capacity as well as one or more RPs 48, EN 14 is configured to compile at 1915 a respectively sorted listing thereof in accordance with its proximity determinations derived from execution(s) of Equations (1)-(3). Once such RPs 17 and RPs 48 are sorted, receipt of a respective BLE advertisement from any one RP 48 triggers the EN 14 to initiate a BLE connection at 1920 with that RP 48 deemed most proximate thereto. Once the connection is established, the EN 14, at 1925, transmits a request to such RP 48 to transmit to the EN 14 a discrete number "p" of ultrasonic emissions, i.e., ultrasound signals. Furthermore, such request also includes the stipulation that transmission of such ultrasonic emissions be delayed by a predetermined period of time "T," e.g., "T" milliseconds. Once the request is received, microprocessor 52 of RP 48 at 1930 coordinates a confirmation that it received and successfully processed the request, and transmits that confirmation to the EN 14, whereafter the RP 48 then enacts its timer 50 to initiate a countdown in accordance with the predetermined period "T." At 1935, the RP 48 simultaneously encodes the EN 14 requested ultrasonic emissions according to a pseudo-random sequence (PRS) derived from the MAC ID. Such emissions are modulated, preferably, using frequency-shift keying (FSK). Notably, each emission, such as emission "a" or emission "b" will comprise a 256 bit-length, whereby the PRS is generated for each emission in accordance with, for example, a linear-feedback shift register (LFSR) implemented, preferably, in the form of software executable by microprocessor 52. However, other methods of obtaining the PRS are also contemplated.

After completion of the FSK modulation and expiration of the countdown requested by the EN 14, the RP 48 transmits at 1940 a first PRS encoded ultrasonic emission, such as emission "a" shown in FIG. 18. In this regard, it is to be understood that each ultrasonic emission transmitted by the RP 48 comprises a series of same PRSs such that a same PRS is repeated back-to-back throughout the length of the emission.

Relative to its transmission of its request to the RP 48 at 1925 and receipt of confirmation from the RP 48, the EN 14 synchronizes to the countdown at 1945. Upon the expiration of a predetermined period following expiration of the countdown, the EN 14 will initiate a discrete sampling, via ADC 54, of each individual PRS that is included in an ultrasound emission, such as emission "a." In this regard, the EN 14 is configured to collect a pair of samples for each bit of each emission, e.g., 512 samples per a 256 bit-length emission. Further, the PRS period, i.e., the period of time associated with transmission of the PRS, may be calculated in accordance with the applicable emission length, transmission rate and modulation thereof, such that an exemplary PRS period may comprise 0.25 seconds. As such, the EN 14 is likewise configured to collect (2×n) samples for each emission during the PRS period, i.e., the PRS period emission, where n is the number of bits per the PRS period emission. At 1950 and 1955, EN 14 analyzes each PRS period and the corresponding PRSs to determine detection of the PRS encoding and verifies whether such detection satisfies criteria (discussed below) permitting a final determination whether there was a valid, i.e., positive, detection, as is discussed in more detail below. If no valid detection is determinable based on the collectively analyzed individual PRS periods of, for example, emission "a," EN 14 will lay dormant during time "T" intervening between one or more other emissions requested by EN 14 and confirmed for transmission by RP 48. If a positive detection of the PRS encoding is found for the RP 48 for based on the collectively analyzed PRS period emissions of, for example, emission "a" or emission "b," EN 14 will acquire the MAC ID of the transmitting RP 48 as being most proximate, and report such MAC ID of the transmitting RP 48 to the network 22 as being the most proximate RP 48 via an appropriate AP 16.

Conversely, if no positive detection is determinable from among those RPs 48 whose ultrasound emissions have been analyzed, EN will, at 1960, cycle to the next most proximate RP 48 and repeat the above-described steps enabling a determination of positive detection based on the PRS encoding. In the event that positivity cannot be ascertained from among the selected RPs 48, the EN 14 will report, through an appropriate AP 16, the MAC ID of that RP 17 without ultrasonic signal emission capacity which is deemed most proximate the EN 14 in accordance with Equations (1)-(3) so that the network 22 may then ascertain the location of the EN 14.

Figure 20:
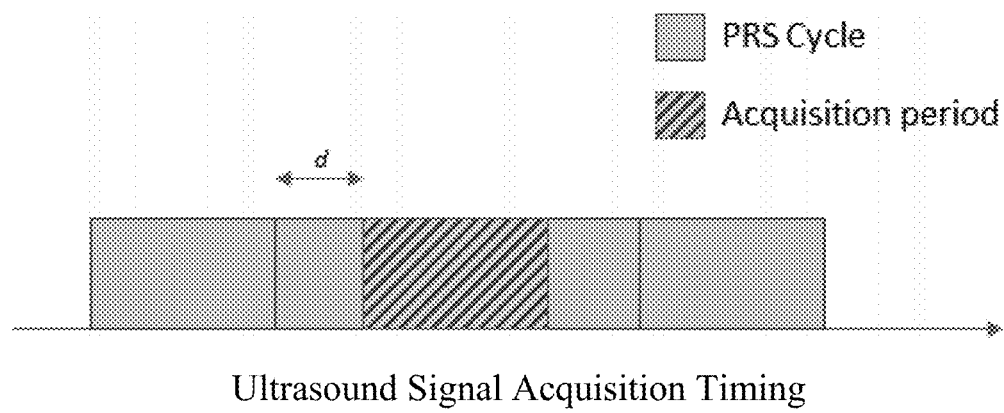
FIG. 20 is an illustration of a sequencing of receipt by the BLE EN of the ultrasonic signal transmitted by the BLE RP with respect to an encoding of the ultrasonic signal by the BLE RP which defines identifying information of the BLE RP.

As has been discussed, when the RP 48 transmits its PRS encoded emission, it does so by repeating the PRS encoding multiple times throughout the course of that emission, i.e., over the course of the several PRS periods defining the length of the emission. As such, it will be understood, as is shown in FIG. 20, that a beginning of acquisition, and thus sampling by the EN 14 of the encoded emission will be delayed relative to a given position within the PRS encoding cycle, or series thereof, by an arbitrary increment of time "d."

Figure 21:
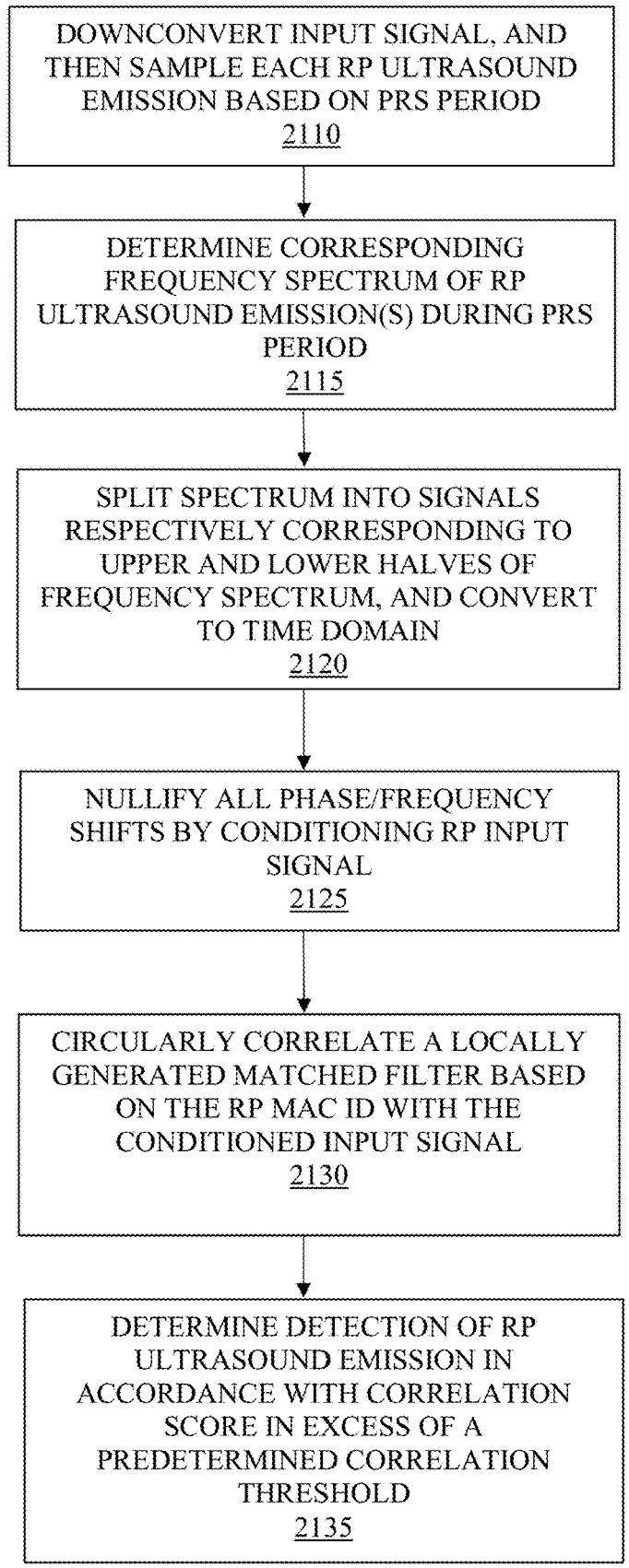
FIG. 21 is a sequence diagram setting forth a manner of sampling of the ultrasonic signal by the BLE EN to determine whether a location of the BLE RP should be attributed to the BLE EN.

In referring to FIG. 21, there is illustrated a sequence by which the EN 14 carries out its analysis of each PRS period emission to the EN 14. At 2110, EN 14 downconverts each RP 48 emission via analog direct conversion such that the corresponding carrier frequency is set to 0 Hz, and then undertakes individualized sampling of each PRS period emission of each encoded emission transmitted by the RP 48 via ADC 54.

With respect to an initial and each subsequent downconverted PRS period emission, i.e., an emission of the PRS over the course of the corresponding PRS period, EN 14 undertakes to transform the PRS period emission at 2115 from the time domain (x), i.e., the ADC 54 sampled PRS period emission defined by or as the RP 48 input signal, to the frequency domain (X) via a Fast Fourier Transform (FFT) or $\mathcal{F}$, wherein $X = \mathcal{F}(x)$.

As is conveyed at 2120, when the spectrum is thus obtained, one sideband of the PRS period emission is contained within a negative half of the spectrum, resulting in $X_-$ below, while the other sideband of the PRS period emission is contained within a positive half of the spectrum, resulting in $X_+$ below.

Thereafter, each sideband is converted back to the time domain using the inverse FFT, $\mathcal{F}^{-1}$, as follows:

$$x_- = \mathcal{F}^{-1}(X_-)$$

$$x_+ = \mathcal{F}^{-1}(X_+).$$

An inherent difficulty in reaching an accurate assessment of ultrasound used in over the air signaling is the occurrence of doppler-induced frequency shift. In order to address this, embodiments herein resolve this difficulty, as is related at 2125, by assessing only the magnitude of the input signal (x) as to each converted sideband, i.e., $|x_+|$ and $|x_-|$. As will be understood, assessing only the above magnitudes nullifies frequency shift by converting the respective PRS period emissions with FSK to on-off keyed (OOK) segments. Through this conversion, a fully conditioned input signal (y) may be obtained, according to $y = |x_+| - |x_-|$.

As has been discussed above in regard to the fact that acquisition of the PRS emission by the EN 14 will lag behind PRS encoding, it is efficient to, as at 2130, circularly correlate the conditioned input signal (y) with a matched filter for the PRS period emission (q) that is locally generated by the EN 14, via microprocessor 46, according to the MAC ID of the RP 48 as received by the EN 14 during the course of the RP 48 BLE advertisement. That is, because the EN 14 will have gained an awareness of the MAC ID of the RP 48 through its initial BLE communication(s) therewith, it is enabled to source and compare the particular portion of the MAC ID that (a) corresponds to the PRS period emission generated by the RP 48 and (b) which ought to be represented by the conditioned input signal (y) generated by the EN 14. This way, the PRS period emission may be evaluated by the EN 14 without regard to the need to synchronize receipt thereof at the EN 14. In these regards, the circular correlation between the input signal (y) and the matched filter (q) for any one PRS period emission may be represented in the time domain by $c = y \otimes q$, or in the frequency domain by (, denoted by uppercase,) $c = \mathcal{F}^{-1}(Y \times Q^*)$, in which $Q^*$ represents the complex conjugate of q.

In view of the above, positive detection of the PRS emission is defined, with respect to the entirety of the respective PRS periods which have been analyzed by the EN 14, in accordance with a correlation score in excess of a predetermined threshold, $\gamma$.

In this regard, the correlation score for each individual PRS period emission represents a level of detection for such emission and is derived, based on the totality of correlations (c) for all of the PRS period emissions occurring over the course of and that define a given entirety of an RP 48 emission, and defined by the quotient of $$\frac{\max(|c|)}{\mathrm{median}(|c|)}.$$

In this way, the temporal movement of the EN 14 may be tracked with respect to one or more RPs 48 such that a predetermined positioning of those one or more RPs 48 may be used by network 22 to discern a location of the EN 14 during its movement over a period of time, e.g., during entry into, traversal, and exiting of room "A." As has been discussed, in the event that the evaluated PRS emissions from the RP 48 do not yield a positive detection as to any one PRS period emission of the PRS, the EN 14 will then select another detected RP 48 to determine whether its PRS emission evaluation(s) produce(s) the above correlation score in excess of the given threshold, γ. In a case in which no positive RP 48 detection can be obtained, i.e., as a result of the EN 14 not being in sufficient proximity to an RP 48 based on an inability of any one RP 48 PRS period emission correlation score to exceed the threshold, γ, the EN 14 will then report that RP 17 which is evaluated as being most proximate.

In these ways, the inability for ultrasound to propagate through solid structure, such as walls and doors in a structure, is advantageously used to narrow a determination of the location of the EN 14 as it moves throughout a given area such as setting 30.

Yet another manner in which an EN 14 may determine its relative coordinate location within, for example, the setting 30 of FIG. 22, follows below. More specifically, the EN 14 may be configured to interact with an RP 48 to exchange BLE communications. In doing so, the RP 48 may be configured to suspend its ultrasonic emission capabilities.

As such, each of the EN 14 and RP 48 may engage in bi-directional communications in which such communications may be characterized by Constant Tone Extension (CTE). In other words, communications sent by each of the EN 14 and RP 48 may include an appended constant wave tone at, for example, the carrier frequency or an offset of 250 kHz. Such CTE may be appended to all communications exchanged between the EN 14 and RP 48, and may be sampled by each of the EN 14 and RP 48 in IQ, or quadrature, format. That is, such sampling may be understood wherein I represents the amplitude of an in-phase carrier, and Q represents the amplitude of the quadrature-phase carrier. The sampling may be carried out by each of the EN 14 and RP 48, as discussed below.

It will be understood that each of the EN 14 and RP 48 may be equipped with all of the necessary hardware and/or software necessary for executing the aforementioned CTE enabled BLE communications, as well as the IQ sampling in connection therewith.

Figure 22:
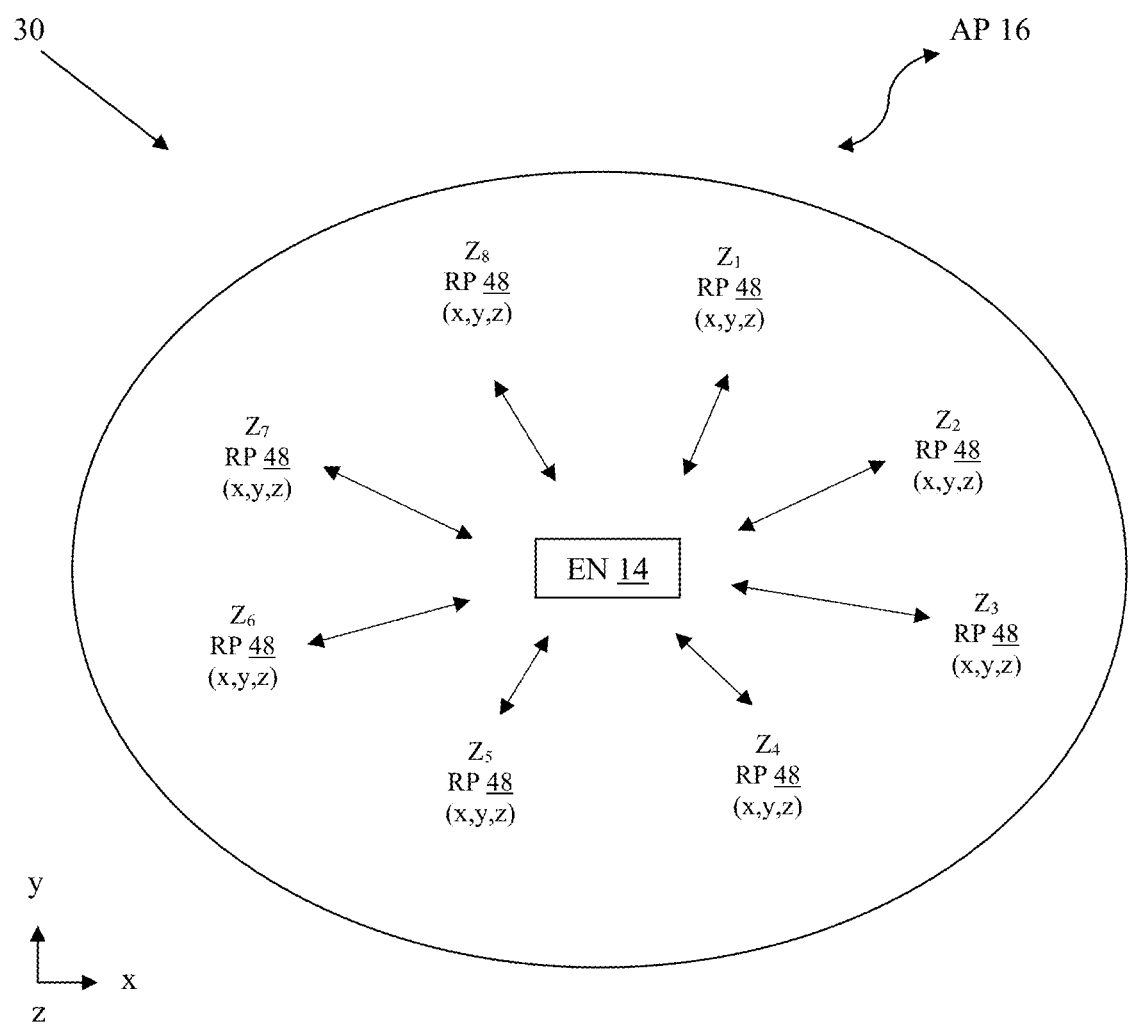
FIG. 22 is an illustration of an area configuration of BLE reference points (RPs) relative to which the BLE EN may determine a nearest proximity to one or more thereof, according to embodiments disclosed herein.
Figure 23:
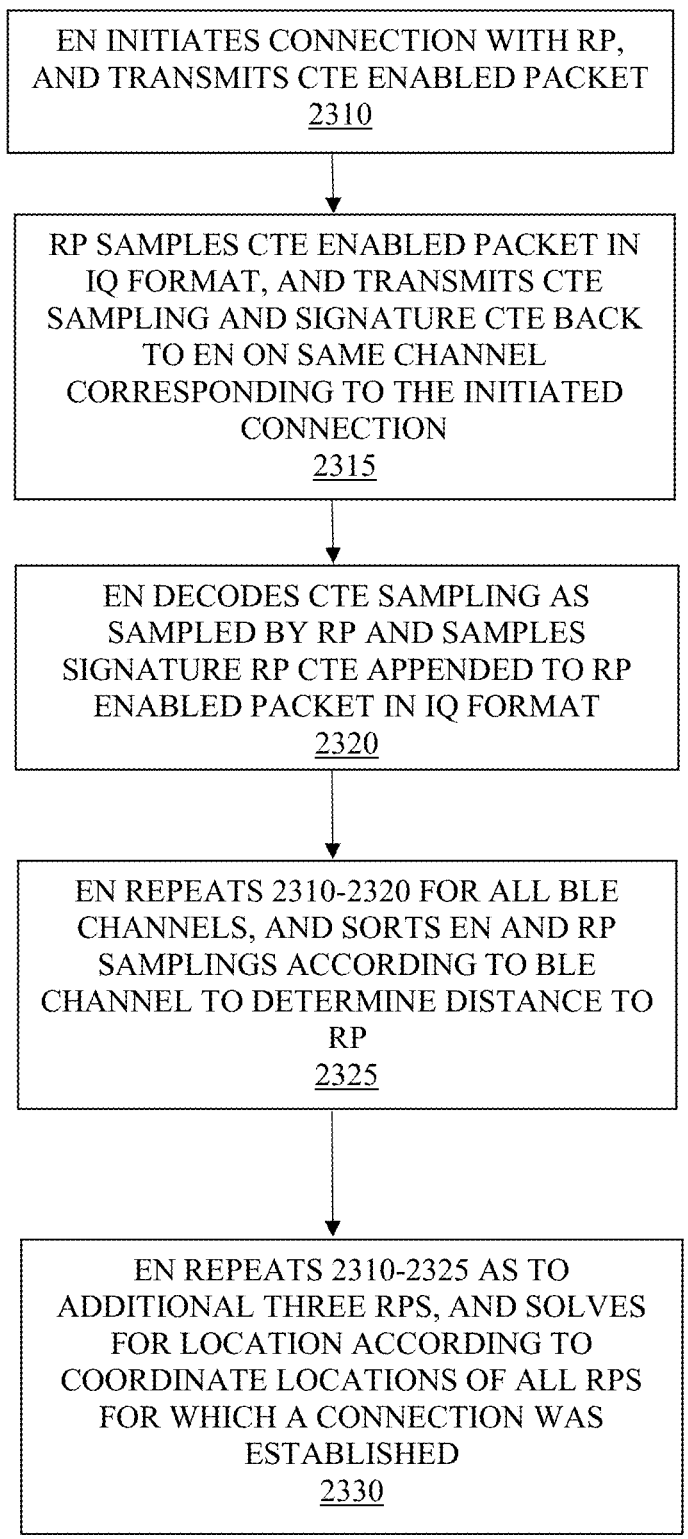
FIG. 23 is a sequence diagram setting forth a manner of location determination by a BLE EN according to Constant Tone Extension (CTE) encoding.

With reference to FIGS. 22 and 23, an EN 14 (or Node A as referred to in the equations below) may perform a scan within setting 30 to detect those RPs 48 (or Nodes B as referred to in the equations below) that are enabled to transmit the CTE, as will be identified by encoding within a respectively transmitted and received beacon advertisement message. Upon detection of such enablement, the EN 14 initiates a connection with the first detected RP 48, and transmits its CTE enabled data packet to such RP 48, at 2310. Here, the data packet may include information pertaining to the initiation of the BLE connection, according to BLE protocol. In particular, the CTE may be described by the following:

$$e^{j(\omega_A t + \varphi_A)},$$

in which
e is Euler's number,
j is the square root of −1,
$\omega_A$ is the angular frequency of EN 14's signal, and
$\varphi_A$ is an arbitrary phase shift of EN 14's signal.

The CTE is received by the RP 48 as the following:

$$e^{j(\omega_A t + \varphi_A + \varphi_{AB}(f,r))},$$

in which
$\varphi_{AB}(f,r)$ is the phase shift introduced during propagation, given as a function of frequency (f) and range (r) by $\varphi(f,r) = -2\pi \cdot r/c$, where c is the speed of light.

With reference to 2315, once the CTE enabled packet is received at the RP 48, the RP 48 conducts its own I/Q sampling of the CTE transmitted by the EN 14, and stores the same. Thereafter, the RP 48 transmits that I/Q sampling back to the EN 14 as a response data packet to which a signature CTE of the RP 48 is also appended. With respect to a signal transmission, the EN 14 may correct for phase and frequency offsets, according to:

$$e^{j((\omega_A - \omega_B)t + \varphi_A - \varphi_B + \varphi_{AB})} e^{j(-(\omega_A - \omega_B)t - \varphi_A + \varphi_B + \varphi_{AB})} =$$
$$e^{j2\varphi_{AB}(f,r)} = Z(f,r),$$

in which Z represents the signal after being converted to complex baseband.

As a result, the EN 14 effectively receives not only the signature CTE of the RP 48, but also the result of the RP 48 sampling of its own CTE. Similar to the RP 48, the EN 14 conducts IQ sampling of the RP 48 signature CTE, and decodes the received response data packet to obtain the RP 48 sampling of its own CTE which had been initially transmitted to the RP 48, as at 2320. That is, the EN 14 is now in possession of two sets of discrete CTE data, including sampling of its CTE as transmitted to the RP 48, as well as sampling of the RP 48 signature CTE performed after receipt of the RP 48 response data packet and as a result of the BLE exchange.

Both sets of discrete CTE data are stored by the EN 14 according to a same channel within the BLE band and a calculated ending phase of the RP 48 CTE enabled data packet. The ending phase may be calculated by the EN 14 according to the RP 48 transmitted data and based on a formula empirically determined from phase measurements of the chipset generating the transmitted signal. Said alternatively, the exchange, i.e., the transmission and receipt of CTE enabled data packets between the EN 14 and the RP 48, occurs without deviation among channels of the BLE band.

With reference to 2325, the EN 14 repeats steps 2310-2325 for all 37 channels of the BLE band that are available for data transmisssion, in order to determine a distance to the RP 48 with which communication has occurred. This way, multiple exchanges of such CTE enabled packets may occur individually on and for all 37 channels of the BLE band that are available for data transmission. When the last channel is exhausted, the RP 48 transmits its own x,y,z coordinate within setting 30. Alternatively, the RP 48 may transmit its x,y,z, coordinate in each response data packet transmitted to the EN 14 at the conclusion of a same channel communication between the EN 14 and RP 48.

In regard to such distance determination, and once having accumulated the CTE sampling as performed by the RP 48 on the initially transmitted EN 14 CTE and the IQ sampling of the signature CTE appended to the received RP 48 data packet at each channel of communication, the EN 14 sorts those samplings into channel, or frequency, order.

For each channel, the EN 14 returns each set of samples to a nominal "starting" phase, by multiplying the same by $e^{(-j \times end\_phase)}$, in which e is Euler's number, j is the square root of −1, and end_phase represents an ending phase value based on data of each packet. Thereafter, samples from each phase are averaged over a configurable window. The corresponding samples from each phase are then multiplied together, for each channel. That is, averaged CTE samples belonging to the EN 14 are multiplied by averaged signature CTE samples belonging to the RP 48, for each channel. The resultant yield is a phase measurement sample, for example, Z(n) as referenced above, that is substantially free of phase and frequency offset for each channel.

While samples for the 37 channels have been described as being collected, it is noted that, with respect to others of channels dedicated to solely advertising, an IQ sample may be interpolated from neighboring channels. Accordingly, samples for the entirety of the BLE band may be obtained as a result of the EN 14-RP 48 bidirectional communication on each of the data communicated channels so as to span the entire BLE band.

A window according to, for example, Hanning or Blackman-Harris, may then be applied to the samples, which may then be zero padded to reach a power of two (2), nominally 128. Thereafter, an Inverse Fast Fourier Transform (IFFT) is performed, after the padding. A peak value (p), in the absence of multipath propagation, may then be selected for use in determining the distance to the RP 48. When multipath propagation is present, a predetermined value, i.e., a value in excess of predetermined threshold, may be selected instead so as to ensure a most direct correlation or path to the RP 48.

A distance to RP 48 may be then be calculated by the EN 14, according to the following:

$$d=(p*c)/(2*\text{IFFT\_LEN}*\text{CH\_SPACING}),$$

in which
p is the peak of the IFFT, c is the speed of light, IFFT_LEN is the number of samples in the IFFT, and CH_SPACING is the BLE channel spacing in Hz (nominally 2 MHz).

With reference to 2330, the EN 14 repeats steps 2310-2325 based on the above discussion in order to acquire distances to each of at least four (4) RPs 48, in total, before proceeding to determine its coordinate location. In this regard, such coordinate location may be derived from the x,y,z, coordinates, i.e., position information, transmitted by each of the RPs 48.

To do so, the EN 14 may be equipped with any hardware and/or software enabling determination of its location within a three-dimensional space, such as setting 30. Thus, through use of the known position information including coordinates $x_0,y_0,x_0$ to $x_3,y_3,z_3$ of each of the evaluated four (4) RPs 48 and the respective distance d, expressed as a range r below, to each RP 48, the EN 14 may undertake a least squares calculation to derive its own x,y,z coordinate location within setting 30.

Accordingly, the EN 14 may undertake the following calculations:

$$A\vec{x}=\vec{b},$$

which may be resolved for $$\vec{x}=(A^T A)^{-1} A^T \vec{b}.$$

Through use of the above, the intersection of those spheres corresponding to the four (4) RPs 48 may be determined as the coordinate location of and by the EN 14. In this regard, the spheres may be determined as:

$$(x-x_n)^2+(y-y_n)^2+(z-z_n)^2=r_n^2.$$

A predetermined range of a selected RP 48 may be used to linearize to obtain:

$$A = \begin{bmatrix} x_1 - x_0 & y_1 - y_0 & z_1 - z_0 \\ x_2 - x_0 & y_2 - y_0 & z_2 - z_0 \\ x_3 - x_0 & y_3 - y_0 & z_3 - z_0 \end{bmatrix},$$

$$\vec{x} = \begin{bmatrix} x - x_0 \\ y - y_0 \\ z - z_0 \end{bmatrix},$$

$$\vec{b} = \begin{bmatrix} \frac{1}{2}\left(r_0^2 - r_1^2 + \|\vec{d}_1 - \vec{d}_0\|_2^2\right) \\ \frac{1}{2}\left(r_0^2 - r_2^2 + \|\vec{d}_2 - \vec{d}_0\|_2^2\right) \\ \frac{1}{2}\left(r_0^2 - r_3^2 + \|\vec{d}_3 - \vec{d}_0\|_2^2\right) \end{bmatrix}$$

in which the coordinate location of the RP 48 may be $\vec{d}_n = \{x_n, y_n, z_n\}$, and the Euclidean norm may be given by $\sqrt{w_x^2 + w_y^2 + w_z^2}$.

Should the communicating RPs 48 be arranged at a same height, i.e., at a same z coordinate, the EN 14 may execute a subsequent iterative, non-linear least squares calculation to arrive at its coordinate location relative to the communicating RPs 48.

In view of the above, the EN 14 may transfer its determined coordinate location to the network 22 via an AP 16, as determined according to Equation (4), as discussed above.

When determining its coordinate location, it is to be understood that the EN 14 may employ not only a single set of RPs 48, but multiples thereof in order to more accurately evaluate its position in a three-dimensional space. In other words, the EN 14 may determine its coordinate location from among multiple sets of RPs 48 in which each set includes at least four (4) RPs 48, which may or may not be exclusive to another set thereof. For example, first and second sets of RPs 48 may include ones which may be common to each other so long as one among those sets is not common to such first and second sets. In other words, the first and second sets of RPs may be free of at least shared RP, such that each of the first and second sets of RPs is a unique set thereof, by definition.

It is to be further understood that one or more techniques described in connection with FIGS. 7-8 may be combined with and/or modified by such techniques as are described in connection with the above description(s) pertaining to FIGS. 22-23. In these ways, a specified coordinate location of an EN 14 may be learned so as to enhance use thereof in any of the herein described application environments.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A BLE communications system, comprising:
an end node (EN);
an access point (AP) configured to connect to a network and transmit a first beacon advertisement message; and
a plurality of reference points (RPs) configured to transmit a second beacon advertisement message,
wherein
the EN is configured to
detect the first and second beacon advertisement messages,
initiate a connection with at least one of the plurality of RPs at a first frequency, and
transmit a Constant Tone Extension (CTE) to the at least one of the plurality of RPs, and
the at least one of the plurality of RPs is configured to receive the CTE, and sample the CTE in in-phase and quadrature (IQ) format, and
transmit the sampled CTE, a signature CTE, and position information to the EN at the first frequency, in which
the EN is further configured to determine a location thereof based on the sampled CTE, the signature CTE, and the position information, and transmit the location via the AP based on a positive evaluation at a time of transmission of the first beacon advertisement message of each of at least (a) whether a proximity of the AP to the EN is a nearest AP proximity and (b) a loading of the network to which the AP is connected.

2. The BLE communications systems of claim 1, wherein:
the first frequency corresponds to a channel of the BLE band.

3. The BLE communications system of claim 2, wherein:
the EN is further configured to sample the signature CTE in IQ format.

4. The BLE communications system of claim 3, wherein:
the EN determines the location thereof based on the sampled CTE, the sampled signature CTE and the position information.

5. The BLE communications system of claim 4, wherein:
the position information comprises coordinate information.

6. The BLE communications system of claim 5, wherein:
the EN communicates with the at least one RP to determine the location of the EN based on the sampled CTE, the sampled signature CTE, and the position information, with respect to all channels of the BLE band as defined by respective frequencies thereof.

7. The BLE communications system of claim 6, wherein:
the EN evaluates the sampled CTE, the sampled signature CTE, and the position information at each channel of the BLE band.

8. The BLE communications system of claim 7, wherein:
the EN performs the evaluation of the sampled CTE, the sampled signature CTE, and the position information from among each RP of a first set of RPs from among the plurality of RPs.

9. The BLE communications system of claim 8, wherein:
the first set of RPs from among the plurality of RPs comprises at least four RPs.

10. The BLE communications system of claim 9, wherein:
the EN performs the evaluation of the sampled CTE, the sampled signature CTE, and the position information from among each RP of a first set and a second set of RPs from among the plurality of RPs.

11. The BLE communications system of claim 10, wherein:
the second set of RPs from among the plurality of RPs comprises at least four RPs.

12. The BLE communications system of claim 11, wherein:
the first set and the second set of RPs from among the plurality of RPs are free of at least one shared RP among the first set and the second set of RPs.

* * * * *